(12) United States Patent
Bradbury et al.

(10) Patent No.: US 10,180,910 B2
(45) Date of Patent: *Jan. 15, 2019

(54) HOST-BASED RESETTING OF ACTIVE USE OF GUEST PAGE TABLE INDICATORS

(71) Applicant: INTERNATIONAL BUSINESS MACHINES CORPORATION, Armonk, NY (US)

(72) Inventors: Jonathan D. Bradbury, Poughkeepsie, NY (US); Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,106

(22) Filed: Oct. 31, 2017

(65) Prior Publication Data

US 2018/0067867 A1 Mar. 8, 2018

Related U.S. Application Data

(63) Continuation of application No. 15/212,477, filed on Jul. 18, 2016.

(51) Int. Cl.
*G06F 12/00* (2006.01)
*G06F 12/1009* (2016.01)
(Continued)

(52) U.S. Cl.
CPC ............ *G06F 12/1009* (2013.01); *G06F 1/24* (2013.01); *G06F 12/1027* (2013.01);
(Continued)

(58) Field of Classification Search
CPC ............ G06F 12/1009; G06F 12/1027; G06F 2212/68; G06F 2212/65; G06F 2212/7201
(Continued)

(56) References Cited

U.S. PATENT DOCUMENTS 4,068,303 A 1/1978 Morita
4,456,954 A 7/1984 Bullions, III et al.
(Continued)

FOREIGN PATENT DOCUMENTS

EP 000067344 A2 12/1982
EP 002248025 B1 3/2012
(Continued)

OTHER PUBLICATIONS

Alkassar, Eyad, et al., "Automated Verification of a Small Hypervisor," Third International Conference, VSTTE 2010, Edinburgh, UK, Aug. 2010. pp. 41-54.
(Continued)

*Primary Examiner* — Mardochee Chery
(74) *Attorney, Agent, or Firm* — Steven Chiu, Esq.; Blanche E. Schiller, Esq.; Heslin Rothenberg Farley & Mesiti P.C.

(57) ABSTRACT

A marking capability is used to provide an indication of whether a block of memory is being used by a guest control program to back an address translation structure. The marking capability includes setting an indicator in one or more locations associated with the block of memory. In a further aspect, the marking capability includes resetting the one or more indicators to indicate that the block of memory is no longer being used by the guest control program to back the address translation structure.

12 Claims, 18 Drawing Sheets

(51) Int. Cl.
*G06F 1/24* (2006.01)
*G06F 12/1027* (2016.01)

(52) U.S. Cl.
CPC ...... *G06F 2212/65* (2013.01); *G06F 2212/68* (2013.01); *G06F 2212/7201* (2013.01)

(58) Field of Classification Search
USPC .......................................................... 711/166
See application file for complete search history.

(56) References Cited

U.S. PATENT DOCUMENTS

| | | | |
|---|---|---|---|
| 4,525,778 A | 6/1985 | Cane |
| 4,733,350 A | 3/1988 | Tone |
| 4,779,188 A | 10/1988 | Gum et al. |
| 5,073,851 A | 12/1991 | Masterson |
| 5,317,705 A | 5/1994 | Gannon et al. |
| 5,317,754 A | 5/1994 | Blandy |
| 5,428,757 A | 6/1995 | Sutton |
| 5,491,806 A | 2/1996 | Horstmann et al. |
| 5,574,878 A | 11/1996 | Onodera |
| 5,896,520 A | 4/1999 | Ohminato et al. |
| 5,978,892 A | 11/1999 | Noel |
| 6,079,013 A | 6/2000 | Webb |
| 6,263,403 B1 | 7/2001 | Traynor |
| 6,430,667 B1 | 8/2002 | Loen |
| 6,604,187 B1 | 8/2003 | McGrath et al. |
| 6,631,447 B1 | 10/2003 | Morioka |
| 6,961,806 B1 | 11/2005 | Agesen |
| 7,114,054 B2 | 9/2006 | Greer |
| 7,117,338 B2 | 10/2006 | Brewer |
| 7,197,585 B2 | 3/2007 | Farrell et al. |
| 7,284,100 B2 | 10/2007 | Slegel et al. |
| 7,296,139 B1 | 11/2007 | Case et al. |
| 7,296,265 B1 | 11/2007 | Krishnan et al. |
| 7,299,337 B2 | 11/2007 | Traut et al. |
| 7,334,108 B1 | 2/2008 | Case et al. |
| 7,363,463 B2 | 4/2008 | Sheu et al. |
| 7,376,949 B2 | 5/2008 | Lowell et al. |
| 7,409,487 B1 | 8/2008 | Chen et al. |
| 7,454,590 B2 | 11/2008 | Jordan et al. |
| 7,509,475 B2 | 3/2009 | Shinohara et al. |
| 7,543,291 B2 | 6/2009 | Lesartr et al. |
| 7,562,179 B2 | 7/2009 | Brandt et al. |
| 7,624,240 B1 | 11/2009 | Colbert |
| 7,636,831 B1 | 12/2009 | Subrahmanyam |
| 7,650,482 B2 | 1/2010 | Traut et al. |
| 7,657,659 B1 | 2/2010 | Lambeth |
| 7,661,102 B2 | 2/2010 | Ogle |
| 7,734,892 B1 | 6/2010 | Rozas et al. |
| 7,814,287 B2 | 10/2010 | Pratt |
| 7,836,275 B2 | 11/2010 | Anderson et al. |
| 7,865,670 B2 | 1/2011 | Cota-Robles et al. |
| 7,941,799 B2 | 5/2011 | Easton et al. |
| 8,015,388 B1 | 9/2011 | Rihan et al. |
| 8,032,716 B2 | 10/2011 | Heller et al. |
| 8,095,771 B2 | 1/2012 | Sheu et al. |
| 8,127,098 B1 | 2/2012 | Klaiber et al. |
| 8,151,085 B2 | 4/2012 | Deutschle et al. |
| 8,166,239 B2 | 4/2012 | Fertig et al. |
| 8,301,863 B2 | 10/2012 | Hall et al. |
| 8,307,191 B1 | 11/2012 | Jain |
| 8,380,907 B2 | 2/2013 | Heller et al. |
| 8,387,049 B2 | 2/2013 | Adlung et al. |
| 8,397,050 B2 | 3/2013 | Chang et al. |
| 8,438,363 B1 | 5/2013 | Koryakin et al. |
| 8,452,942 B2 | 5/2013 | Slegel et al. |
| 8,490,085 B2 | 7/2013 | Devaux |
| 8,738,932 B2 | 5/2014 | Lee et al. |
| 8,745,356 B2 | 6/2014 | Maruyama |
| 8,930,635 B2 | 1/2015 | Woffinden |
| 8,954,709 B2 | 2/2015 | Nishiguchi et al. |
| 9,069,715 B2 | 6/2015 | Deutschle et al. |
| 9,075,721 B2 | 7/2015 | Tamura |
| 9,081,707 B2 | 7/2015 | Conrad et al. |
| 9,086,989 B2 | 7/2015 | Gupta et al. |
| 9,092,382 B2 | 7/2015 | Deutschle et al. |
| 9,182,984 B2 | 11/2015 | Greiner et al. |
| 9,330,018 B2 | 5/2016 | Deutschle et al. |
| 9,697,135 B2 | 7/2017 | Deutschle et al. |
| 9,798,597 B1 | 10/2017 | Duale et al. |
| 2004/0064618 A1 | 4/2004 | Farrell et al. |
| 2004/0117593 A1 | 6/2004 | Uhlig et al. |
| 2004/0225765 A1 | 11/2004 | Greer |
| 2006/0259734 A1 | 11/2006 | Sheu et al. |
| 2006/0294288 A1 | 12/2006 | Seth |
| 2007/0016904 A1 | 1/2007 | Adlung et al. |
| 2007/0050594 A1 | 3/2007 | Augsburg |
| 2008/0016315 A1 | 1/2008 | Cohen |
| 2008/0133875 A1 | 6/2008 | Cohen |
| 2008/0155168 A1 | 6/2008 | Sheu |
| 2008/0201540 A1 | 8/2008 | Sahita et al. |
| 2008/0320216 A1 | 12/2008 | Fertig et al. |
| 2009/0013149 A1 | 1/2009 | Uhlig et al. |
| 2009/0158004 A1 | 6/2009 | Hasegaw et al. |
| 2009/0216928 A1 | 8/2009 | Heller et al. |
| 2009/0216984 A1 | 8/2009 | Gainey, Jr. et al. |
| 2010/0074146 A1 | 3/2010 | Banks |
| 2010/0250895 A1 | 9/2010 | Adams |
| 2010/0274987 A1 | 10/2010 | Subrahmanyam et al. |
| 2011/0082962 A1 | 4/2011 | Horovitz et al. |
| 2011/0320755 A1 | 12/2011 | Blake et al. |
| 2012/0017039 A1 | 1/2012 | Margetts |
| 2012/0246387 A1 | 9/2012 | Kanno |
| 2012/0331266 A1 | 12/2012 | Anraku |
| 2013/0042066 A1 | 2/2013 | Price |
| 2013/0246605 A1 | 9/2013 | Mahadik et al. |
| 2013/0339655 A1 | 12/2013 | Hom et al. |
| 2013/0339656 A1 | 12/2013 | Greiner et al. |
| 2013/0339657 A1 | 12/2013 | Greiner et al. |
| 2014/0095840 A1 | 4/2014 | Heller |
| 2014/0101401 A1 | 4/2014 | Mulcahy et al. |
| 2014/0129798 A1 | 5/2014 | Deutschle et al. |
| 2014/0129800 A1 | 5/2014 | Deutschle et al. |
| 2014/0230077 A1 | 8/2014 | Muff et al. |
| 2014/0325167 A1 | 10/2014 | Slegel et al. |
| 2014/0331224 A1 | 11/2014 | Robenko et al. |
| 2015/0058522 A1 | 2/2015 | Armstrong et al. |
| 2015/0089116 A1 | 3/2015 | Chin et al. |
| 2015/0100748 A1 | 4/2015 | Farrell et al. |
| 2015/0106599 A1 | 4/2015 | Gainey, Jr. et al. |
| 2015/0120985 A1 | 4/2015 | Frey et al. |
| 2015/0149997 A1 | 5/2015 | Tsirkin et al. |
| 2015/0151056 A1 | 6/2015 | Deguillard et al. |
| 2015/0161056 A1 | 6/2015 | Deguillard et al. |
| 2015/0242227 A1 | 8/2015 | Nair |
| 2015/0269085 A1 | 9/2015 | Gainey |
| 2015/0331802 A1 | 11/2015 | Cain, III et al. |
| 2015/0370592 A1 | 12/2015 | Tuch et al. |
| 2017/0024326 A1 | 1/2017 | Luo |
| 2017/0123996 A1 | 5/2017 | Kishan |
| 2017/0249261 A1 | 8/2017 | Durham |
| 2017/0371695 A1 | 12/2017 | Sanjeepan |
| 2018/0018093 A1 | 1/2018 | Bradbury et al. |
| 2018/0018190 A1 | 1/2018 | Heller et al. |
| 2018/0018274 A1 | 1/2018 | Bradbury et al. |
| 2018/0018275 A1 | 1/2018 | Bradbury et al. |
| 2018/0018276 A1 | 1/2018 | Bradbury et al. |
| 2018/0018277 A1 | 1/2018 | Bradbury et al. |
| 2018/0018278 A1 | 1/2018 | Bradbury et al. |
| 2018/0018279 A1 | 1/2018 | Bradbury et al. |
| 2018/0018280 A1 | 1/2018 | Bradbury et al. |
| 2018/0018281 A1 | 1/2018 | Bradbury et al. |
| 2018/0018282 A1 | 1/2018 | Bradbury et al. |
| 2018/0018283 A1 | 1/2018 | Borntraeger et al. |
| 2018/0018284 A1 | 1/2018 | Borntraeger et al. |
| 2018/0052777 A1 | 2/2018 | Bradbury et al. |
| 2018/0067868 A1 | 3/2018 | Bradbury et al. |

FOREIGN PATENT DOCUMENTS

| | | |
|---|---|---|
| EP | 2862059 | 4/2015 |
| JP | S61156445 A | 7/1986 |
| JP | 4769308 | 9/2011 |

(56) References Cited

FOREIGN PATENT DOCUMENTS

| KR | 101287448 B1 | 7/2013 |
|---|---|---|
| TW | 201413454 | 4/2014 |
| WO | WO2006039057 A3 | 4/2006 |
| WO | WO2013101378 AI | 7/2013 |
| WO | WO2014036004 A1 | 3/2014 |
| WO | WO2015009318 A1 | 1/2015 |
| WO | WO2015145620 A1 | 1/2015 |

OTHER PUBLICATIONS

Arya, K., et al., "Tesseract: Reconciling Guest I/O and Hypervisor Swapping in a VM," ACM SIGPLAN Notices, 49(7), Mar. 2014, pp. 15-28.

Axnix, C. et al., "IBM z13 Firmware Innovations for Simultaneous Multithreading and I/O Virtualization," IBM Journal of Research and Development, vol. 59, No. 4/5, Paper 11, Jul./Sep. 2015, pp. 11:1-11:11.

Caraman, Mihai, "Patchwork KVM: PPC: e500mc: Relax TLB Invalidation Condition on VCPU Schedule," Jun. 2014, pp. 1-9.

Coscarella, et al., "System for Purging TLB," IP.com No. 000052724, Feb. 2005, pp. 1-2 (+ cover).

Frey, B.G., & Mueller, M.J., "Translation Lookaside Buffer Castout Queue," IP.com No. IPCOM000120766D, Apr. 2, 2005, pp. 106-107 (+ cover).

IBM, "Power ISA V2.07B", Apr. 9, 2015, pp. 1-1527.

IBM, "System /370 Extended Architecture/Interpretive Execution," IBM Publication No. SA22-7095-01, Sep. 1985, pp. 1-32.

IBM, "z/Architecture—Principles of Operation," IBM Publication No. SA22-7832-10, 11$^{th}$ Edition, Mar. 2015, pp. 1-1732.

IBM, "z/VM: Running Guest Operating Systems," IBM® Publication No. SC24-5997-02, Oct. 2001, pp. 1-179.

IPCOM000128917, IBM, "IBM System/370 Systems Principles of Operation," IP.com No. 000128917, pp. 1-356 (+ cover).

IPCOM000146587D, Anonymous, "An Efficient TLB Virtualization Algorithm Using Machine Contiguous Page Information in a Virtualization Environment," Feb. 16, 2017, pp. 1-4.

IPCOM000192722D, Mihm, Thomas, Jr., et al., "Four Reasons Your Next Mobile Product Should have a Hypervisor," Feb. 2010, pp. 1-8.

IPCOM000222815D, Anonymous, "Multi-Level Nested Translation Lookaside Buffers," Oct. 23, 2012, p. 1 (+ cover).

Kerrigan, et al., "Table Lookaside Buffer with Selective Space Invalidation," IP.com No. 000087098, Mar. 2005, p. 1 (+ cover).

Mel, Peter and Tim Grance, "The NIST Definition of Cloud Computing," National Institute of Standards and Technology, Information Technology Laboratory, Special Publication 800-145, Sep. 2011, pp. 1-7.

Nordholz, Jan et al., "XNPro: Low-Impact Hypervisor-Based Execution Prevention on ARM," TrustED, Oct. 2015, pp. 55-64.

Osisek, et al., "ESA/390 interpretive-execution architecture, foundation for VM/ESA," IBM Systems Journal, vol. 30, No. 1, Jan. 1991, pp. 34-51.

Samanta, et al., "Dynamic Aggregation of Virtual Addresses in TLB using TCAM Cells," 21$^{st}$ International Conference on VLSI Design, Jan. 2008, pp. 243-248.

Schwarz, et al., "The Microarchitecture of the IBM eServer z900 Processor," IBM Journal of Research and Development 46, No. 4, Jul. 2002, pp. 381-395.

Sobania, Jan-Arne et al., "Towards Symmetric Multi-Processing Support for Operating Systems on the SCC," 4$^{th}$ MARC Symposium, Dec. 2011, pp. 73-78.

Vahidi, A. et al., "VETE: Virtualizing the Trusted Execution Environment," SICS Technical Report T2013:02, Mar. 2013, pp. 1-35.

Venkatasubramanian, et al., "TMT—A TLB Tag Management Framework for Virtualized Platforms," 21$^{st}$ Annual Symposium on Computer Architecture and High Performance Computing, Oct. 2009, pp. 153-160.

Whang, Z., et al., "Hypersafe: A Lightweight Approach to Provide Lifetime Hypervisor Control-Flow Integrity," 2010 IEEE Symposium on Security and Privacy, May 2010, pp. 380-395.

Yu, Cong et al., "Protecting the Security and Privacy of the Virtual Machine through Privilege Separation," Proceedings of the 2$^{nd}$ International Conference on Computer Science and Electronics Engineering, 2013 (no further date information available), pp. 2224-2228.

Bradbury, et al., "Host Page Management Using Active Guest Page Table Indicators," U.S. Appl. No. 15/212,492, filed Jul. 18, 2016 (108 pages).

Bradbury, et al., "Host-Based Resetting of Active Use of Guest p. Table Indicators," U.S. Appl. No. 15/212,477, filed Jul. 18, 2016 (79 pages).

Bradbury, et al., "Marking Storage Keys to Indicate Memory Used to Back Address Translation Structures," U.S. Appl. No. 15/212,462, filed Jul. 18, 2016 (71 pages).

Bradbury, et al., "Reducing Over-Purging of Structures Associated with Address Translation Using an Array of Tags," U.S. Appl. No. 15/212,436, filed Jul. 18, 2016 (88 pages).

Bradbury, et al., "Managing Memory Used to Back Address Translation Structures," U.S. Appl. No. 15/212,409, filed Jul. 18, 2016 (72 pages).

Bradbury, et al., "Reducing Purging of Structures Associated with Address Translation," U.S. Appl. No. 15/212,396, filed Jul. 18, 2016 (57 pages).

Bradbury, et al., "Reducing Over-Purging of Structures Associated with Address Translation," U.S. Appl. No. 15/212,347, filed Jul. 18, 2016 (83 pages).

Bradbury, et al., "Marking Page Table/Page Status Table Entries to Indicate Memory Used to Back Address Translation Structures," U.S. Appl. No. 15/212,379, filed Jul. 18, 2016 (71 pages).

Bradbury, et al., "Marking to Indicate Memory Used to Back Address Translation Structures," U.S. Appl. No. 15/212,524, filed Jul. 18, 2016 (69 pages).

Borntraeger, et al., "Selective Purging of Guest Entries of Structures Associated with Address Translation," U.S. Appl. No. 15/212,503, filed Jul. 18, 2016 (56 pages).

Heller, et al., "Delaying Purging of Structures Associated with Address Translation," U.S. Appl. No. 15/212,360, filed Jul. 18, 2016 (66 pages).

Bradbury, et al., "Increasing the Scope of Local Purges of Structures Associated with Address Translation," U.S. Appl. No. 15/212,546, filed Jul. 18, 2016 (69 pages).

Borntraeger, et al., "Selective Purging of Entries of Structures Associated with Address Translation in a Virtualized Environment," U.S. Appl. No. 15/212,570, filed Jul. 18, 2016 (57 pages).

Bradbury et al., "Host Page Management Using Active Guest Page Table Indicators", U.S. Appl. No. 15/801,360, filed Nov. 2, 2017 (101 pages).

Bradbury et al., "Marking Storage Keys to Indicate Memory Used to Back Address Translation Structures", U.S. Appl. No. 15/801,359, filed Nov. 2, 2017 (65 pages).

List of IBM Patents or Patent Applications Treated as Related, Dec. 12, 2017, pp. 1-2.

IBM, "PJ40387: Provide Local IPTE Support," Oct. 2012, http://www-01.ibm.com/support/docview.wss?uid=swg1PJ40387, pp. 1-7.

Brown et al., Fundamentals of Digital Logic with Verilog Design, Jul. 2002, pp. 367-368 (+ cover).

IBM, "z/Architecture—Principles of Operation," SA22-7832-10, Eleventh Edition, Mar. 2015, pp. 10-36 thru 10-39 (+ cover).

ESSA $R_1$, $R_2$, $M_3$

REGISTER SPECIFIED BY $R_1$

HOST-BASED RESETTING OF ACTIVE USE OF GUEST PAGE TABLE INDICATORS

CROSS-REFERENCE TO RELATED APPLICATIONS

This application is a continuation of co-pending U.S. patent application Ser. No. 15/212,477, filed Jul. 18, 2016, entitled "HOST-BASED RESTING OF ACTIVE USE OF GUEST PAGE TABLE INDICATORS," which is hereby incorporated herein by reference in its entirety.

BACKGROUND

One or more aspects relate, in general, to processing within a computing environment, and in particular, to processing associated with memory being used to back address translation structures.

In computing environments that support virtualization technology, an operating system may be running on a virtual machine on a processor that supports multiple levels of address translation tables. In such an environment, the operating system is a guest of a hypervisor also executing in the computing environment.

When the memory backing an address translation table is paged-out to a storage medium, associated entries, such as translation look-aside buffer (TLB) entries that depend on those pages, may need to be purged. Further, when those entries are to be rebuilt, the latency for rebuilding those entries in such environments becomes much longer.

Further, since the hypervisor currently does not know what pages it owns that back address translation tables, it cannot be intelligent with its paging decisions. Although there are existing mechanisms for an operating system to inform the hypervisor of the likelihood of a page being reused, this is often just a suggestion and may take a lot of work by the operating system to determine how often a page is being used.

SUMMARY

Shortcomings of the prior art are overcome and additional advantages are provided through the provision of a computer-implemented method of resetting indicators of a computing environment. The method includes, for instance, obtaining, by a processor, for a block of memory located in host memory managed by a host virtual machine manager and assigned for use by a guest program managed by the host virtual machine manager, one or more locations having a particular indicator. The particular indicator indicating whether the block of memory is being actively used by the guest program to back an address translation data structure. Resetting processing is performed for one or more indicators in the one or more locations, based on obtaining the one or more locations.

Computer program product and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a marking capability is used to provide an indication of whether a block of memory (e.g., a page) is backing an address translation structure (e.g., a page table, a segment table, a region table and/or any other table used for address translation) used by a control program, such as an operating system. In one example, the control program is executing as a guest and is managed by a host virtual machine manager, such as a hypervisor. Further, the block of memory is a block of host memory managed by the virtual machine manager. The marking is provided in host memory, such as in a host address translation data structure, including, for instance, a host page table entry (PTE), or in a host page status table entry (PGSTE); and/or in a storage key associated with host memory.

By providing the marking, the virtual machine manager may check the indication prior to making paging decisions. For instance, the virtual machine manager may select not to free a block of memory, if it is indicated as backing an address translation structure. Other memory management actions may also be similarly controlled.

Further, with this marking information, the virtual machine manager may provide a hint to the hardware (e.g., processor) that may be used in decisions relating to purging associated address translation structures, such as translation look-aside buffer (TLB) entries.

In a further aspect, a resetting feature is provided as part of the marking capability, which is used to reset marking indicators included in page table entries, page status table entries and/or a storage keys.

In one embodiment, an instruction may be used to initiate and/or perform the marking.

Although in the examples herein, the block of memory is a page of memory (e.g., 4 kilobytes (KB)), in other embodiments, the block of memory may be of a different size than a page of memory, and/or the page of memory may be other than 4 KB.

Figure 1:
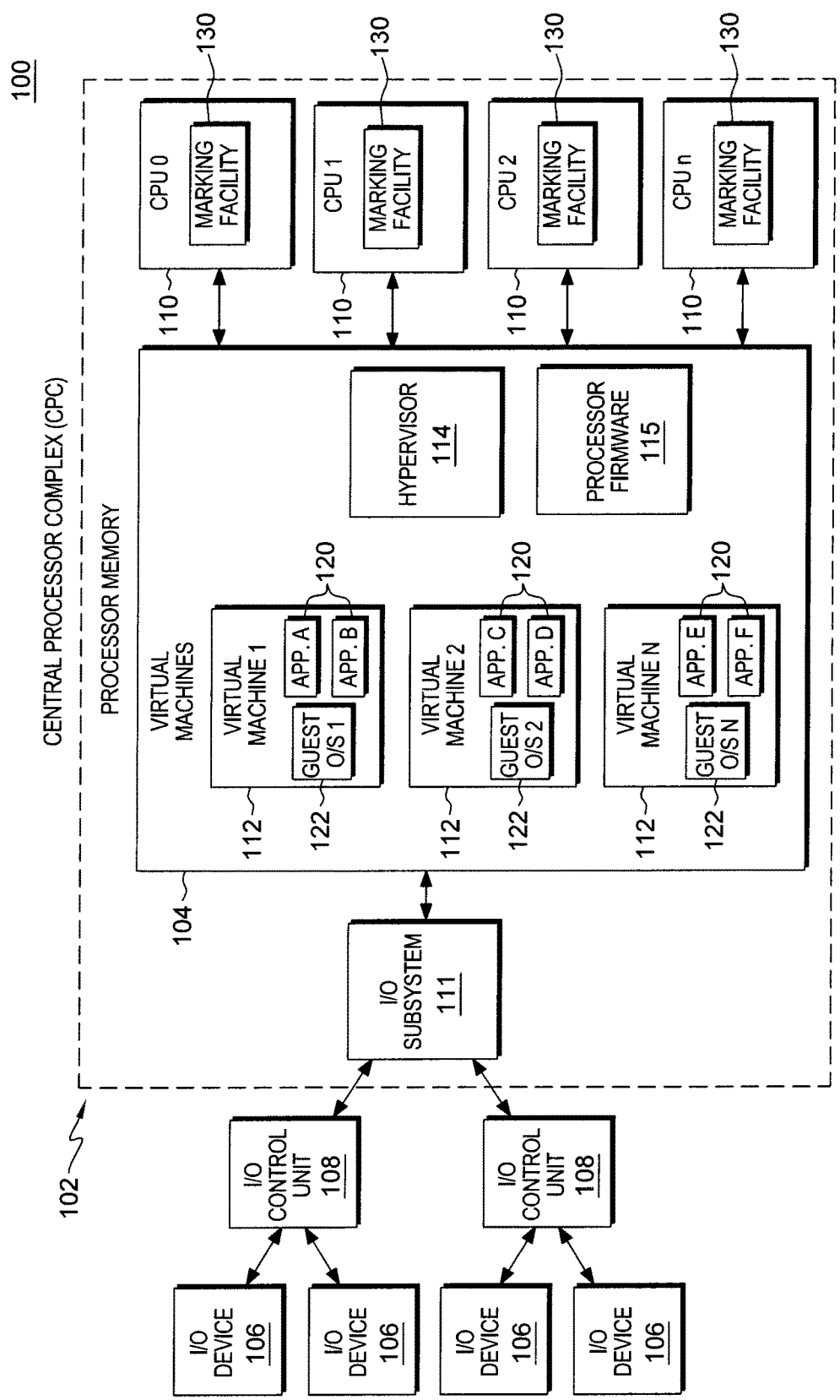
FIG. 1 depicts one example of a virtual computing environment to incorporate and use one or more aspects of a marking facility, in accordance with an aspect of the present invention.

One example of a computing environment to incorporate and use one or more aspects of a marking facility is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7832-10, 11$^{th}$ Edition, March 2015, which is hereby incorporated by reference herein in its entirety. Z/ARCHITECTURE, IBM, Z/VM and Z/OS (referenced herein) are registered trademarks of International Business Machines Corporation, Armonk, N.Y. Other names used herein may be registered trademarks, trademarks or product names of International Business Machines Corporation or other companies.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

Computing environment 100 includes a central processor complex (CPC) 102 providing virtual machine support. CPC 102 is coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more virtual machines 112, a virtual machine manager, such as a hypervisor 114, that manages the virtual machines, and processor firmware 115. One example of hypervisor 114 is z/VM®, offered by International Business Machines Corporation, Armonk, N.Y. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the CPC provides the ability to operate large numbers of virtual machines 112, each capable of operating with different programs 120 and running a guest operating system 122, such as Linux. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 104 is coupled to central processors (CPUs) 110, which are physical processor resources assignable to virtual machines. For instance, virtual machine 112 includes one or more logical processors, each of which represents all or a share of a physical processor resource 110 that may be dynamically allocated to the virtual machine. In one embodiment, central processor 110 includes a marking facility 130 used, as described herein, to indicate whether a block of host memory is being used to back a guest address translation structure.

Further, processor memory 104 is coupled to an I/O subsystem 111. Input/output subsystem 111 directs the flow of information between input/output control units 108 and devices 106 and main storage 104. It is coupled to the central processing complex, in that it can be a part of the central processing complex or separate therefrom.

In this particular example, the model of virtual machines is a V=V model, in which the real or absolute memory of a virtual machine is backed by host virtual memory, instead of real or absolute memory. Each virtual machine has a contiguous virtual memory space. The physical resources are managed by host 114, and the shared physical resources are dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests.

In one embodiment, the host (e.g., z/VM®) and processor (e.g., System z) hardware/firmware interact with each other in a controlled cooperative manner in order to process guest operating system operations without requiring the transfer of control from/to the guest operating system and the host. Guest operations can be executed directly without host intervention via a facility that allows instructions to be interpretively executed for the guest, including a pageable storage mode guest. This facility provides an instruction, Start Interpretive Execution (SIE), which the host can issue, designating a control block called a state description which holds guest (virtual machine) state and controls, such as execution controls and mode controls. The instruction places the machine into an interpretive-execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception.

Figure 2A:
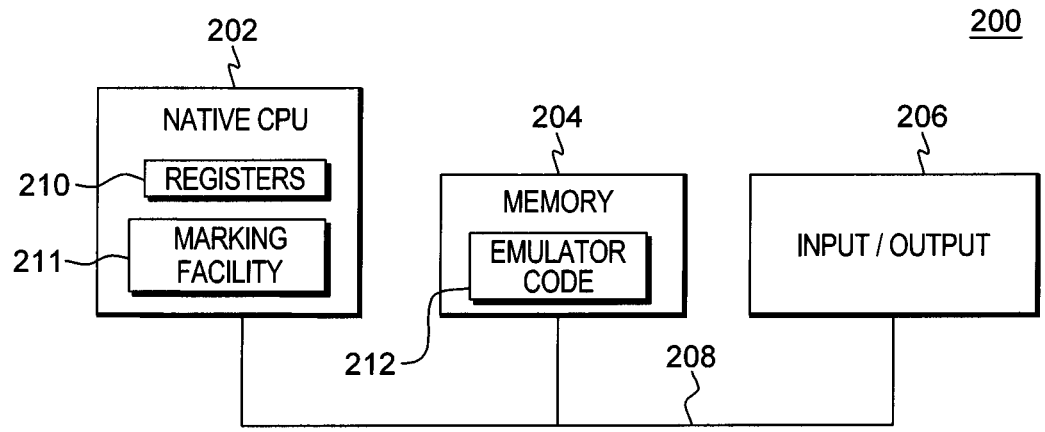
FIG. 2A depicts another example of a computing environment to incorporate and use one or more aspects of a marking facility, in accordance with an aspect of the present invention.

Another example of a computing environment to incorporate and use one or more aspects of the marking facility is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a z Systems server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment, as well as a marking facility 211. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate one or more other architectures. For instance, emulator code 212 allows machines based on architectures other than the z/Architecture, such as PowerPC processors, Power Systems servers, HP Superdome servers or others, to emulate the z/Architecture and to execute software and instructions developed based on the z/Architecture.

Figure 2B:
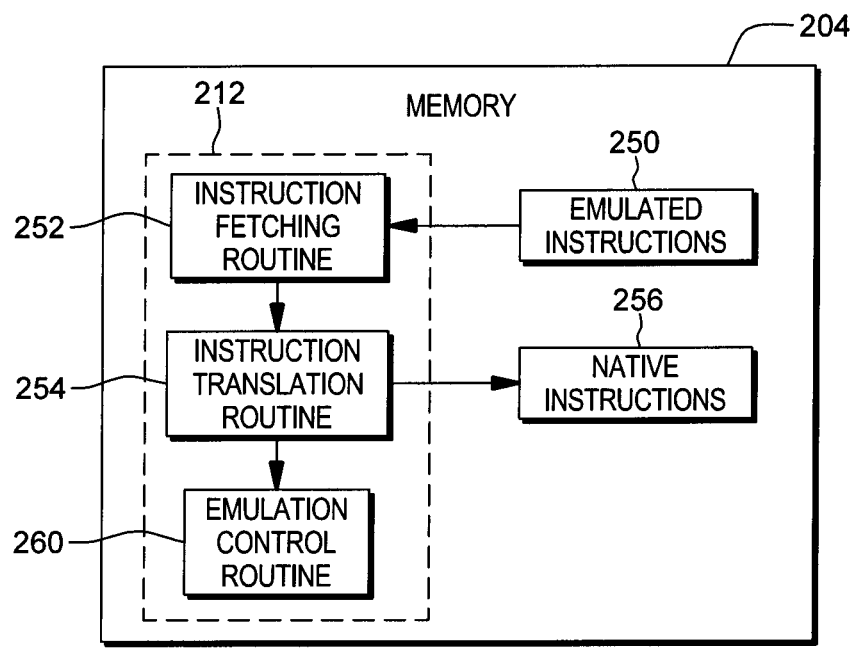
FIG. 2B depicts further details of the memory of FIG. 2A.

Further details relating to emulator code 212 are described with reference to FIG. 2B. Emulated instructions 250 stored in memory 204 comprise software instructions (e.g., correlating to machine instructions) that were developed to be executed in an architecture other than that of native CPU 202. For example, emulated instructions 250 may have been designed to execute on a z/Architecture processor, but instead, are being emulated on native CPU 202, which may be, for example, an Intel Itanium II processor. In one example, emulator code 212 includes an instruction fetching routine 252 to obtain one or more emulated instructions 250 from memory 204, and to optionally provide local buffering for the instructions obtained. It also includes an instruction translation routine 254 to determine the type of emulated instruction that has been obtained and to translate the emulated instruction into one or more corresponding native instructions 256. This translation includes, for instance, identifying the function to be performed by the emulated instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, emulated instructions 250, native instructions 256 and emulator code 212 may reside in the same memory or may be disbursed among different memory devices.

The computing environments described herein support architectural functions, such as dynamic address translation (DAT). With appropriate support by an operating system, the dynamic address translation facility may be used to provide to a user a system in which storage appears to be larger than the main storage which is available in the configuration. This apparent main storage is referred to as virtual storage, and the addresses used to designate locations in the virtual storage are referred to as virtual addresses. The virtual storage of a user may far exceed the size of the main storage which is available in the configuration and normally is maintained in auxiliary storage (e.g., storage not directly addressable). The virtual storage is considered to be composed of blocks of addresses, called pages. Only the most recently referred to pages of the virtual storage are assigned to occupy blocks of physical main storage (e.g., random access memory (RAM)). As the user refers to pages of virtual storage that do not appear in main storage, they are brought in to replace pages in main storage that are less likely to be needed. The swapping of pages of storage may be performed by the operating system without the user's knowledge.

Moreover, in virtual computing embodiments, the interpretative execution architecture provides a storage mode for absolute storage referred to as a pageable storage mode. In pageable storage mode, dynamic address translation at the host level is used to map guest main storage. The host has the ability to scatter the real storage of pageable storage mode guests to usable frames anywhere in host real storage by using the host DAT, and to page guest data out to auxiliary storage. This technique provides flexibility when allocating real machine resources while preserving the expected appearance of a contiguous range of absolute storage for the guest.

A virtual machine environment may call for application of DAT multiple times: first at the guest level, to translate a guest virtual address through guest managed translation tables into a guest real address, and then, for a pageable guest, at the host level, to translate the corresponding host virtual address to a host real address.

A sequence of virtual addresses associated with a virtual storage is called an address space, and the dynamic address translation facility may be used to provide a number of address spaces. These address spaces may be used to provide degrees of isolation between users. Such support can include a completely different address space for each user, thus providing complete isolation, or a shared area may be provided by mapping a portion of each address space to a single common storage area. Also instructions are provided which permit a semi-privileged program to access more than one such address space. Dynamic address translation provides for the translation of, for instance, virtual addresses from multiple different address spaces without requiring that the translation parameters in the control registers be changed.

Dynamic address translation is the process of translating a virtual address during a storage reference into the corresponding real or absolute address. Dynamic address translation may be specified for instruction and data addresses generated by the CPU. The real or absolute address that is formed by dynamic address translation, and the absolute address that is then formed by prefixing, in one embodiment, are 64 bits in length. The virtual address may be a primary virtual address, a secondary virtual address, an AR (Access Register)-specified virtual address, or a home virtual address. The addresses are translated by means of the primary, the secondary, an AR-specified, or the home address space control element (ASCE), respectively. After selection of the appropriate address space control element, the translation process is the same for all of the four types of virtual addresses. An address space control element may be a segment table designation or a region table designation. A segment table designation or region table designation causes translation to be performed by means of tables established by the operating system in real or absolute storage.

In the process of translation when using a segment table designation or a region table designation, three types of units of information are recognized—regions, segments, and pages. The virtual address, accordingly, is divided into four fields. In one example, bits 0-32 are called the region index (RX), bits 33-43 are called the segment index (SX), bits 44-51 are called the page index (PX), and bits 52-63 are called the byte index (BX). The RX part of a virtual address is itself divided into three fields. Bits 0-10 are called the region first index (RFX), bits 11-21 are called the region second index (RSX), and bits 22-32 are called the region third index (RTX), in one embodiment.

One example of translating a virtual address to a real address is described with reference to FIG. 3A. This process is referred to herein as a DAT walk (or a page walk) in which the address translation tables are walked to translate one address (e.g., a virtual address) to another address (e.g., a real address). In this example, an address space control element (ASCE) 300 includes a table origin 302, as well as a designation type (DT) control 304, which is an indication of a start level for translation (i.e., an indication at which level in the hierarchy address translation is to begin). Using table origin 302 and DT 304, the origin of a particular table is located. Then, based on the table, bits of the virtual address are used to index into the specific table to obtain the origin of the next level table. For instance, if the region first table (RFT) 306 is selected, then bits 0-10 (RFX) 308 of the virtual address are used to index into the region first table to obtain an origin of a region second table 310. Then, bits 11-21 (RSX) 312 of the virtual address are used to index into region second table (RST) 310 to obtain an origin of a region third table 314. Similarly, bits 22-32 (RTX) 316 of the virtual address are used to index into region third table (RTT) 314 to obtain an origin of a segment table 318. Then, bits 33-43 (SX) 320 of the virtual address are used to index into segment table 318 to obtain an origin of page table 322, and bits 44-51 (PX) 324 of the virtual address are used to index into page table 322 to obtain a page table entry (PTE) 325 having a page frame real address (PFRA) 326. The page frame real address is then combined (e.g., concatenated) with offset 328 (bits 52-63) to obtain a real address. Prefixing may then be applied to obtain the corresponding absolute address.

Another example of address translation is described with reference to FIG. 3B. In this example, a DAT walk is performed to translate an initial guest virtual address to a final host real address. In this example, address space control element (ASCE) 300 is a guest address space control element, and DT 304 of ASCE 300 indicates that guest translation determined by guest address translation structure 360 is to start at region first table 306 pointed to by table origin 302. Thus, the appropriate bits of the initial guest virtual address (e.g., RFX 308) are used to index into region first table 306 to obtain a pointer of an entry of the region first table. The address of the region first table entry (RFTE) is a guest real or absolute address. This guest real or absolute address, with the main storage origin and limit applied, when appropriate, corresponds to a host virtual address. This intermediate host virtual address is then translated using host address translation structures 370. In particular, address space control element (ASCE) 350 is a host address space control element used to indicate a start level for translation in host address translation structures 372. Based on the start level (e.g., region first table) indicated by DT 354, the particular bits of the host virtual address are used to index into the indicated table with table origin 352 to be used for translation using host address translation 372, as described with reference to FIG. 3A. The translation of the host virtual address corresponding to the guest RFTE continues until a host page frame real address (PFRA) 374*a* is obtained.

Data at the intermediate host page frame real address is a pointer to the next level of guest address translation structures (e.g., guest region second table 310, in this particular example), and translation continues, as described above. Specifically, host address translation structures 376, 378, 380 and 382 are used to translate the intermediate host virtual addresses associated with the guest region second table 310, region third table 314, segment table 318 and page table 322, respectively, resulting in host PFRAs 374*b*, 374*c*, 374*d* and 374*e*, respectively. Host page frame real address 374*e* includes the address of a guest page table entry 325. Guest page table entry 325 includes a guest page frame real address 326, which is concatenated with the offset from the initial guest virtual address to obtain the corresponding guest absolute address. In some cases, the main storage origin and limit are then applied to calculate the corresponding host virtual address, which is then translated, as described above, using address translation structures 384 to obtain host page frame real address 374*f*. The host page frame real address is then combined (e.g., concatenated) with the offset (e.g., bits 52-63) of the host virtual address to obtain the final host real address. This completes translation of a guest virtual address to a host real address.

Although in the above examples, translation starts at the region first table, this is only one example. Translation may start at any level for either the guest or the host.

In one embodiment, to improve address translation, the virtual address to real or absolute address translation mapping is stored in an entry of a translation look-aside buffer (TLB). The TLB is a cache used by the memory management hardware to improve virtual address translation speed. The next time translation for a virtual address is requested, the TLB will be checked and if it is in the TLB, there is a TLB hit and the real or absolute address is retrieved therefrom. Otherwise, a page walk is performed, as described above.

As indicated, guest translations may be included in the TLB. These entries may be composite guest/host entries which implicitly include one or more host translations. For example, a guest virtual TLB entry may buffer the entire translation from the initial guest virtual address down to the final host real or absolute address. In this case, the guest TLB entry implicitly includes all intermediate host translations 372, 376, 378, 380 and 382, as well as the final host translation 384, as described in FIG. 3B above. In another example, a hierarchical TLB may contain an entry in a first level of the TLB which buffers a translation from the initial guest virtual address down to the associated origin of the guest page table 322 and a separate entry from a second level of the TLB which buffers the translation from the guest page table entry address down to the final host real or absolute address. In this example, guest entries in the first level of the TLB implicitly include intermediate host translations 372, 376, 378 and 380 which correspond to the host translations which back guest region and segment tables, and guest entries in the second level implicitly include intermediate host translation 382 which backs the guest page table and final host translation 384, as described in FIG. 3B. Many implementations of a translation look-aside buffer are possible.

Figure 4:
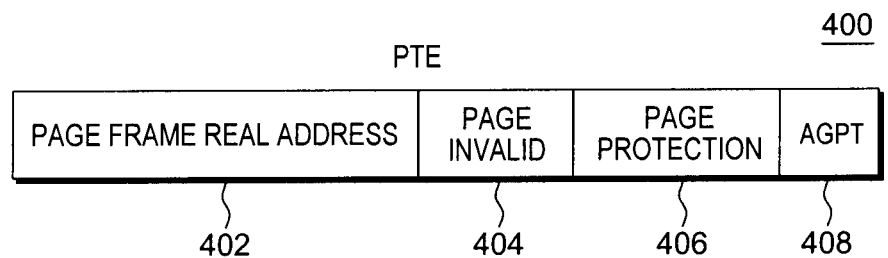
FIG. 4 depicts one example of a page table entry, in accordance with an aspect of the present invention.

In the above examples, the page frame real address is included in a page table entry of a page table. The page table includes one or more entries, and further details of a page table entry are described with reference to FIG. 4.

In one example, a page table entry (PTE) 400 is associated with a particular page of memory and includes:

(a) Page Frame Real Address (PFRA) 402: This field provides the leftmost bits of a real (in this case, host real) storage address. When these bits are concatenated with the byte index field of the virtual address on the right, the real address is obtained.

(b) Page Invalid Indicator (I) 404: This field controls whether the page associated with the page table entry is available. When the indicator is zero, address translation proceeds by using the page table entry. Further, the host state is r (resident state). When the indicator is one, the page table entry cannot be used for translation, and the host state is p (preserved state) or z (logically zero state), as determined by PGSTE.Z, described below.

(c) Page Protection Indicator 406: This field controls whether store accesses are permitted into the page.

(d) Active Use for Guest Page Table (AGPT) indicator 408: This field is used, in accordance with an aspect of the present invention, to indicate whether this host page is being used by a guest to back an address translation structure, such as a page table, a segment table, a region table, etc. In one example, a one indicates it is not used to back an address translation structure, and a zero indicates it is used.

A page table entry may include more, fewer and/or different fields than described herein. For instance, in the Power Architecture, the PTE may include a reference indicator that indicates whether a corresponding block of memory has been referenced, and/or a change indicator that indicates that a corresponding block of memory has been stored into. Other variations are possible.

Corresponding to a host page table entry, in one example, is a page status table entry (PGSTE). In one embodiment, there is one page status table per host page table, the page status table is the same size as the page table, a page status table entry is the same size as a page table entry, and the page status table is located at a fixed displacement (in host real memory) from the page table. Thus, there is a one-to-one correspondence between each host page table entry and page status table entry. Given the host's virtual address of a guest page, both the machine and the host can easily locate the page status table entry that corresponds to a page table entry for a guest block of memory.

Figure 5:
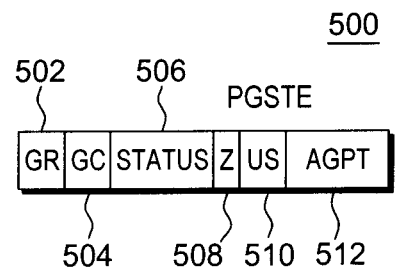
FIG. 5 depicts one example of a page status table entry, in accordance with an aspect of the present invention.

One example of a page status table entry (PGSTE) 500 is described with reference to FIG. 5. Page status table entry 500 includes, for instance, the following:

(a) GR 502: Guest reference backup indicator;

(b) GC 504: Guest change backup indicator;

(c) Status 506: Including, for instance, control bits for coordinating between host and guest operations;

(d) Page Content Logically Zero Indicator (Z) 508: This bit is meaningful when the corresponding PTE page invalid indicator (PTE.I) bit (described above) is one.

When Z is one, the content of the page that is described by this PGSTE and corresponding PTE is considered to be zero. Any prior content of the page does not have to be preserved by the host and may be replaced by a page of zeros.

When the Z bit is one and the corresponding PTE.I bit is one, the host state is z (logically zero). This means that the page content may be replaced by the host. When the page content is replaced, the page may be replaced by associating it with a frame that has been set to zeros.

When the Z bit is zero and the PTE invalid bit is one, the host state is p (preserved) and the content of the page is preserved by the host.

(e) Usage State (US) 510: Indicates whether the guest state is S (stable), U (unused), V (volatile) or P (potentially volatile).

(f) Active Use for Guest Page Table (AGPT) indicator 512: This field is used, in accordance with an aspect of the present invention, to indicate whether this host page is being used by a guest to back an address translation structure, such as a page table, a segment table, a region table, etc. In one example, a one indicates it is not used to back an address translation structure, and a zero indicates it is used.

The PGSTE may include more, fewer and/or different fields in one or more embodiments.

Various host states are mentioned above. Further information regarding these states include:

1. Resident (r) state: The guest block is present in a host page frame.

A host page frame (a.k.a., frame) is a block (e.g., 4K-byte) of host real memory that is used to contain, or back host pages that contain, in this context, guest blocks (a.k.a., block of memory). A host page is a page (e.g., 4K-byte) of virtual memory that is used to implement a block of guest memory. A guest block is a block (e.g., 4K-byte) of memory (on, for instance, a 4K-byte boundary) that the guest views as a block of its physical (or absolute) memory.

2. Preserved (p) state: The guest block is not present in a host page frame, but has been preserved by the host in some auxiliary storage.

3. Logically Zero (z) state: The guest block is not present in a host page frame and the contents of the guest block are known to be zeros.

The logically zero state is the initial (or default) host state.

The association of guest and host state information also includes the defining of available guest states. As examples, the following guest states are defined:

1. Stable (S) state: The contents of a stable block remain equal to what was set by the guest. The host is responsible for preserving the contents of a block in the stable state, if the backing page frame is reclaimed.

The stable state is the default guest state of a block.

2. Unused (U) state: The contents of an unused block are not meaningful to the guest. After the guest sets the state of a block to the unused state, the host may at any time discard the contents of the block and reclaim the backing page frame. When the host discards the contents of the block, it changes the host state to z.

The guest is not to reference a block in the unused state; otherwise, an addressing exception may occur.

3. Volatile (V) state: The contents of a volatile block are meaningful to the guest, but the host may at any time discard the contents of the block and reclaim the backing page frame. The guest can tolerate such loss of the block contents because it has the ability to recreate them. If the host reclaims the backing page frame, the host changes the host state of the block to z.

The guest may attempt to reference the contents of a block in the guest volatile state. This will either succeed, if the guest/host state of the block is Vr (resident), or will result in a block volatility exception, if the guest/host state of the block is Vz (logically zero).

Any changes the guest may make to the contents of a block in the guest volatile state will be lost, if the block is discarded.

4. Potentially Volatile (P) state: The contents of a potentially volatile block are meaningful to the guest, but based upon guest change history, the host either may discard or should preserve the contents of the block.

If the change indicator associated with the block indicates that the block has not been changed, the host may at any time discard the contents of the block and reclaim the backing page frame. The guest can tolerate such a loss of the block contents, because it has the ability to recreate them. If the host discards a potentially volatile block, the host changes the guest/host state of the block to Vz (Volatile and logically zero).

If the change indicator associated with the block indicates that the block has been changed, the host preserves the contents of the block. When the host preserves the contents on auxiliary storage, it changes the guest/host state of the block from Pr (Potentially Volatile resident) to Sp (Stable preserved).

The guest P (Potentially Volatile) state offers the benefits of both the V (Volatile) and S (Stable) states. This allows the guest to change the contents of blocks in the guest P state, ensuring block content preservation by the host. For those blocks in the guest P state that are not changed by the guest, the host may efficiently discard the contents and reclaim the host page frame without incurring the overhead associated with block content preservation.

The machine (e.g., firmware other than the guests and host) and the host ensure that the state of the guest block is in one of the following permissible guest/host block states: Sr, Sp, Sz, Ur, Uz, Vr, Vz, or Pr.

Further, in one embodiment, each block of memory, such as each 4 k-byte block of real or absolute memory, may have associated therewith a storage key. The storage key provides a reliability mechanism that is used to segregate blocks of storage, ensuring that programs executing in one key do not accidentally store into blocks having a different key. Moreover, a storage key provides indications to an operating system as to which blocks have been referenced and changed, thus allowing the operating system to determine which blocks may need to be written to auxiliary storage.

Figure 6:
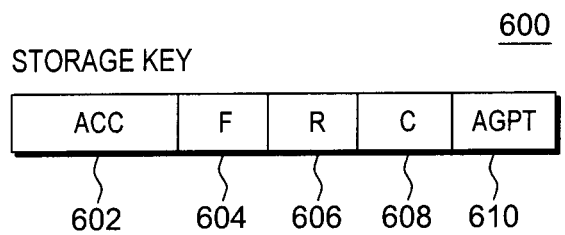
FIG. 6 depicts one example of a storage key, in accordance with an aspect of the present invention.

One example of a storage key is described with reference to FIG. 6. A storage key 600 includes for instance, an access control (ACC) component 602, a fetch protection (F) component 604, a reference (R) component 606, a change (C) component 608, and an Active Use for Guest Page Tables (AGPT) indicator 610, each of which is described below:

Access control bits (ACC) 602: If a reference is subject to key-controlled protection, the access control bits are matched with an access key (e.g., of the program status word or from an instruction operand) when information is stored, or when information is fetched from a location that is protected against fetching.

Fetch-protection bit (F) 604: If a reference is subject to key-controlled protection, the fetch protection bit controls whether key-controlled protection applies to fetch-type references; a 0 indicates that only store-type references are monitored and that fetching with any access key is permitted; a 1 indicates that key-control protection applies to both fetching and storing. No distinction is made between the fetching of instructions and of operands.

Reference bit (R) 606: The reference bit normally is set to 1 each time a location in the corresponding storage block is referred to either for storing or for fetching of information.

Change bit (C) 608: The change bit is set to 1 each time information is stored at a location in the corresponding storage block.

Active Use for Guest Page Tables (AGPT) indicator 610: This field is used, in accordance with an aspect of the present invention, to indicate whether this host page frame is being used to back a guest address translation structure, such as a page table, a segment table, a region table, etc. In one example, a one indicates it is not used to back an address translation structure, and a zero indicates it is used.

Figure 7A:
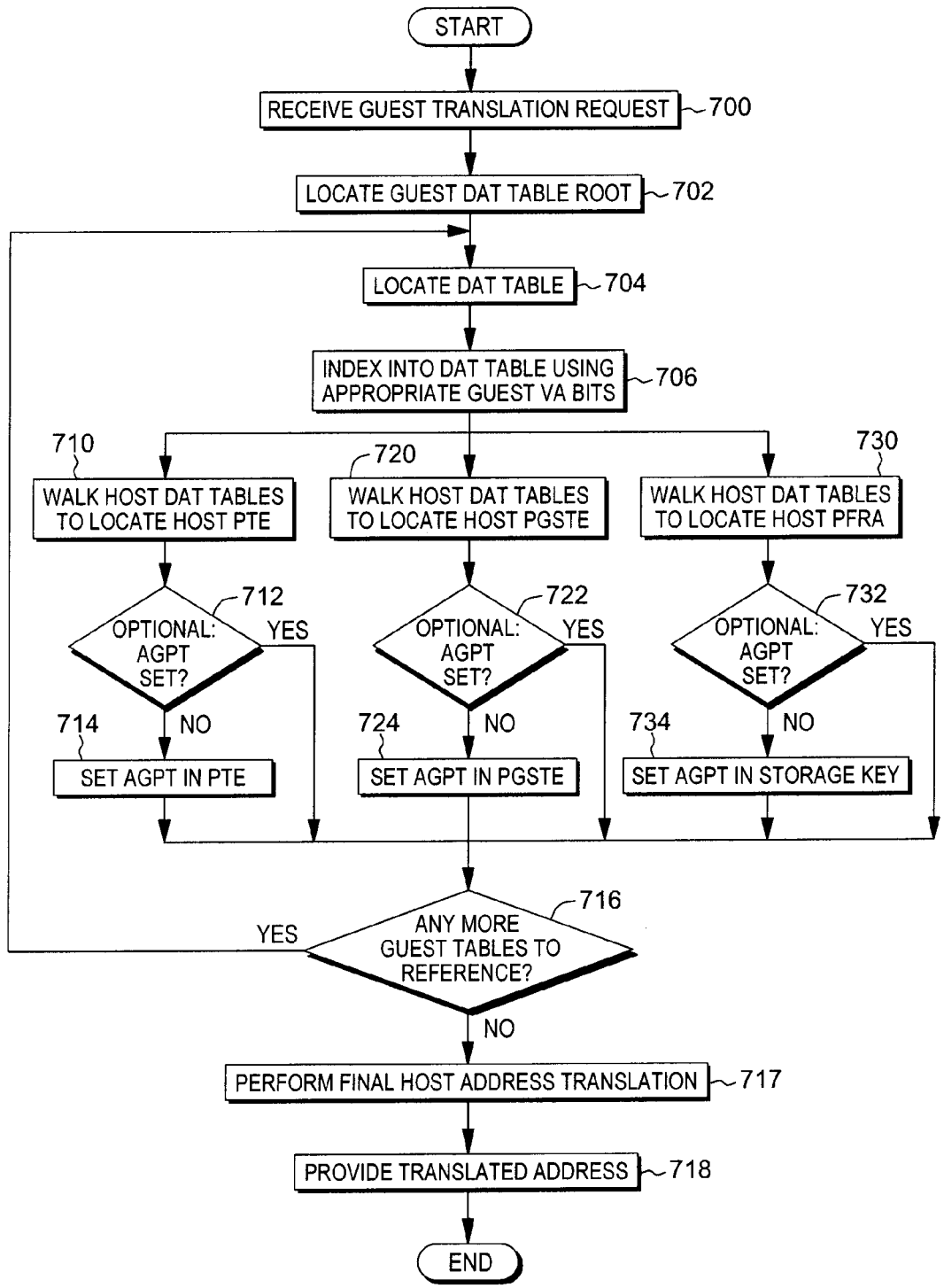
FIG. 7A depicts one example of logic used for marking memory, in accordance with an aspect of the present invention.

As indicated above, the Active Use for Guest Page Tables indicator, regardless of whether in the host PTE, PGSTE, storage key, or another location, is set for a block of memory (e.g., a page) based on a guest control program (e.g., a guest operating system) using the block of memory for an address translation structure (e.g., a page table, a segment table, a region table, and/or any other table used for address translation). Thus, one embodiment of tracking active pages or other blocks of memory supporting guest address translation structures (referred to herein as guest page tables for convenience) is described with reference to FIG. 7A. This logic is performed by a processor.

Initially, the processor receives a guest translation request, e.g., from a program, to translate a virtual address to a real (or absolute) address, STEP 700. Based on receiving the request, a determination is made as to the root of the guest address translation structure, STEP 702. The root is provided, for instance, by the guest address space control element (ASCE) 300. Using the determined root, a guest address translation structure (e.g., DAT table, such as, e.g., a region table, a segment table, a page table, etc.) is located, STEP 704. The processor indexes into the guest DAT table using appropriate bits of the guest virtual address (VA) to obtain an entry in the DAT table, as described with reference to FIGS. 3A-3B, STEP 706. For instance, if the DAT table is region first table 306, then RFX 308 of the guest virtual address is used to obtain an entry in the guest region first table (RFT). Then, host address translation 372 is provided for the address of that (RFT) entry, as described with reference to FIG. 3B, to obtain a host page table entry, a page status table entry, and/or a host real address (PFRA).

Particularly, in one example, the host DAT tables (e.g., host DAT tables 372, in this example) are walked for the address of the indexed guest RFT entry, as described with reference to FIG. 3B, to locate a host page table entry (PTE), STEP 710. A determination is made as to whether the AGPT is set (e.g., equal to zero) in this entry, INQUIRY 712. If it is not set, it is set, STEP 714, and processing continues to INQUIRY 716. Otherwise, if it is already set, processing continues to INQUIRY 716. Optionally, INQUIRY 712 can be bypassed and the AGPT bit can be set (e.g., equal to zero), STEP 714, regardless of its current value.

In a further example, the host DAT tables (e.g., host DAT tables 372, in this example) are walked for the address of the indexed guest RFT entry to locate a host page status table entry (PGSTE), STEP 720. For instance, the DAT tables are walked to locate the page table entry and from there the page status table entry is located. A determination is made as to whether the AGPT is set (e.g., equal to zero) in this entry, INQUIRY 722. If it is not set, it is set, STEP 724, and processing continues to INQUIRY 716. Otherwise, if it is already set, processing continues to INQUIRY 716. Optionally, INQUIRY 722 can be bypassed and the AGPT bit can be set (e.g., equal to zero), STEP 724, regardless of its current value.

In yet a further example, the host DAT tables (e.g., host DAT tables 372, in this example) are walked for the address of the indexed guest RFT entry to locate a host page frame real address (PFRA) 374a, STEP 730. For instance, the DAT tables are walked to locate the page table entry and the host page frame real address is obtained therefrom. The host page frame real address is used to locate a corresponding storage key, and a determination is made as to whether the AGPT is set (e.g., equal to zero) in the storage key, INQUIRY 732. If it is not set, it is set, STEP 734, and processing continues to INQUIRY 716. Otherwise, if it is already set, processing continues to INQUIRY 716. Optionally, INQUIRY 732 can be bypassed and the AGPT bit can be set (e.g., equal to zero), STEP 734, regardless of its current value.

At INQUIRY 716, a determination is made as to whether there are any more guest translation tables to be referenced. If so, translation continues with the next level of DAT table (e.g., a region second table 310 if the root was a region first table, as shown in FIGS. 3A-3B), STEP 704. Otherwise, final host address translation is performed, as described in FIG. 3B, STEP 717. For instance, the guest page frame real address (PFRA) 326 is translated using the host DAT structures (e.g., DAT structures 384) to obtain the host page frame real address (PFRA) 374f. The host page frame real address is then concatenated with the offset of the host virtual address, and this translated address is provided to the requestor, STEP 718.

Figure 7B:
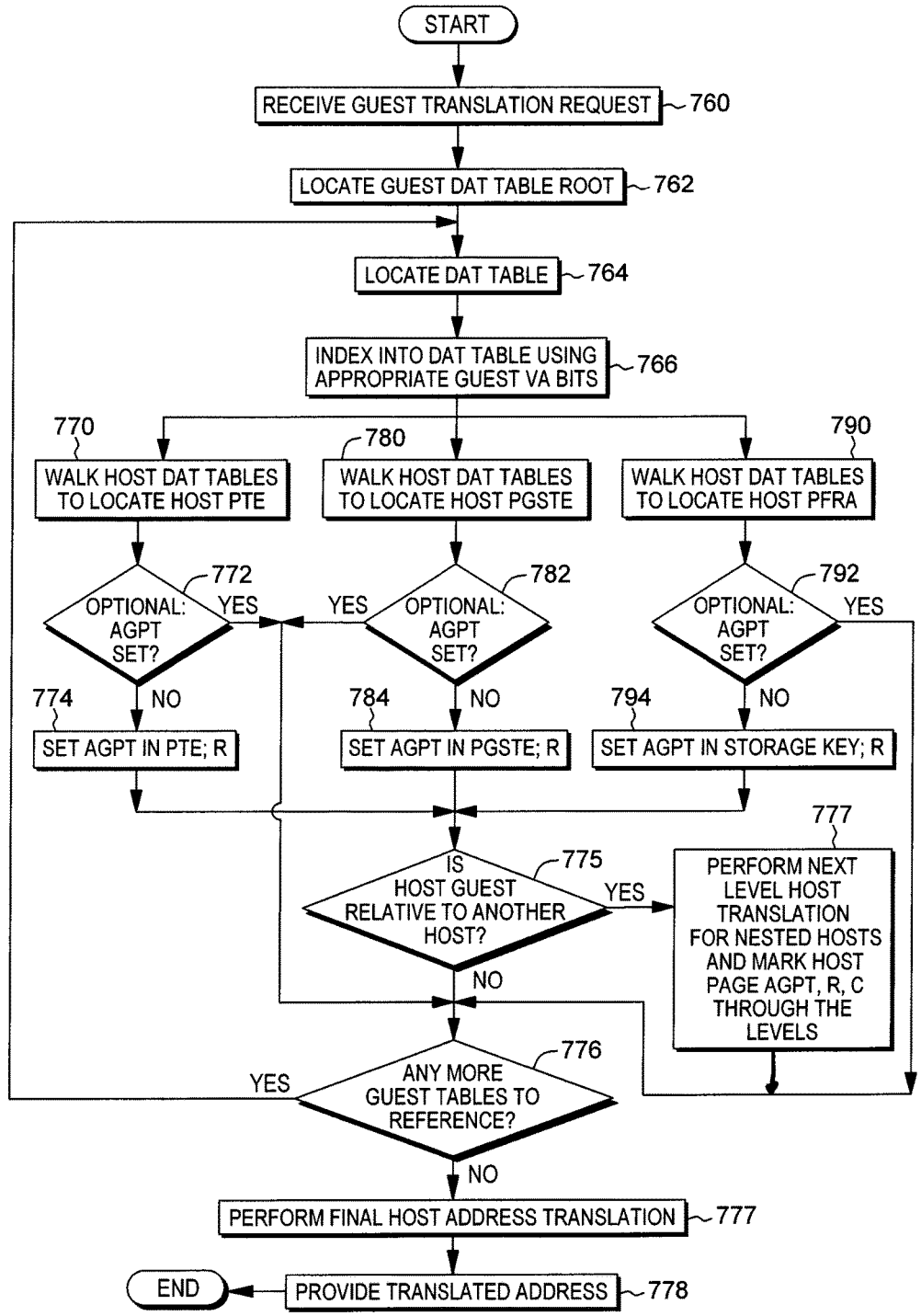
FIG. 7B depicts another example of logic used for marking memory, in accordance with an aspect of the present invention.

Another embodiment of tracking active pages supporting guest page tables is described with reference to FIG. 7B. This logic is performed by a processor.

Initially, the processor receives a guest translation request to translate a virtual address to a real (or absolute) address, STEP 760. Based on receiving the request, a determination is made as to the root of the guest address translation structure, STEP 762. The root is provided, for instance, by the guest address space control element (ASCE) 300. Using the determined root, a guest address translation structure (e.g., DAT table, such as e.g., a region table, a segment table, a page table, etc.) is located, STEP 764. The processor indexes into the guest DAT table using appropriate bits of the guest virtual address (VA) to obtain an entry in the DAT table, as described with reference to FIGS. 3A-3B, STEP 766. For instance, if the DAT table is region first table 306, then RFX 308 of the guest virtual address is used to obtain an entry in the guest region first table (RFT). Then, host address translation 372 is provided for the address of that RFT entry, as described with reference to FIG. 3B, to obtain a host page table entry, a page status table entry, and/or a host real address (PFRA).

Particularly, in one example, the host DAT tables (e.g., host DAT tables 372, in this example) are walked for the address of the indexed guest RFT entry, as described with reference to FIG. 3B, to locate a host page table entry (PTE), STEP 770. A determination is made as to whether the AGPT is set (e.g., equal to zero) in this entry, INQUIRY 772. If it is not set, it is set, as well as a reference indicator (R) (e.g., in the host page table entry, the corresponding PGSTE and/or the storage key), STEP 774, and processing continues to INQUIRY 775. Otherwise, if it is already set, processing continues to INQUIRY 776. Optionally, INQUIRY 772 can be bypassed and the AGPT and reference bits can be set (e.g., equal to zero and one, respectively), STEP 774, regardless of their current values.

In a further example, the host DAT tables (e.g., host DAT tables 372, in this example) are walked for the address of the indexed guest RFT entry to locate a host page status table entry (PGSTE), STEP 780. For instance, the DAT tables are walked to locate the page table entry and from there the page status table entry is located. A determination is made as to whether the AGPT is set (e.g., equal to zero) in this entry, INQUIRY 782. If it is not set, it is set, as well as a reference indicator (R) (e.g., in the host PTE, the corresponding PGSTE, and/or the storage key), STEP 784, and processing continues to INQUIRY 775. Otherwise, if it is already set, processing continues to INQUIRY 776. Optionally, INQUIRY 782 can be bypassed and the AGPT and reference bits can be set (e.g., equal to zero and one, respectively), STEP 784, regardless of their current values.

In yet a further example, the host DAT tables (e.g., host DAT tables 372, in this example) are walked for the address of the indexed guest RFT entry to locate a host page frame real address (PFRA) 374a, STEP 790. For instance, the DAT tables are walked to locate the page table entry and the host page frame real address is obtained therefrom. The host page frame real address is used to locate a corresponding storage key, and a determination is made as to whether the AGPT is set (e.g., equal to zero) in the storage key, INQUIRY 792. If it is not set, it is set, as well as a reference indicator (R) (e.g., in the host PTE, the corresponding PGSTE, and/or the storage key), STEP 794, and processing continues to INQUIRY 775. Otherwise, if it is already set, processing continues to INQUIRY 776. Optionally, INQUIRY 792 can be bypassed and the AGPT and reference bits can be set (e.g., equal to zero and one, respectively), STEP 794, regardless of their current values.

At INQUIRY 775, a determination may be made as to whether this host is a guest relative to another host. If so, the next level host translation is performed for the nested hosts, and the AGPT and reference indicator (R) through the host levels are set, as described above, STEP 777. Further, the change indicator (C) is set through the host levels, as appropriate changes are made to the entries. Processing continues to INQUIRY 776. However, if this host is not guest relative to another host, then processing continues at INQUIRY 776.

At INQUIRY 776, a determination is made as to whether there are any more guest translation tables to be referenced.

Figure 3A:
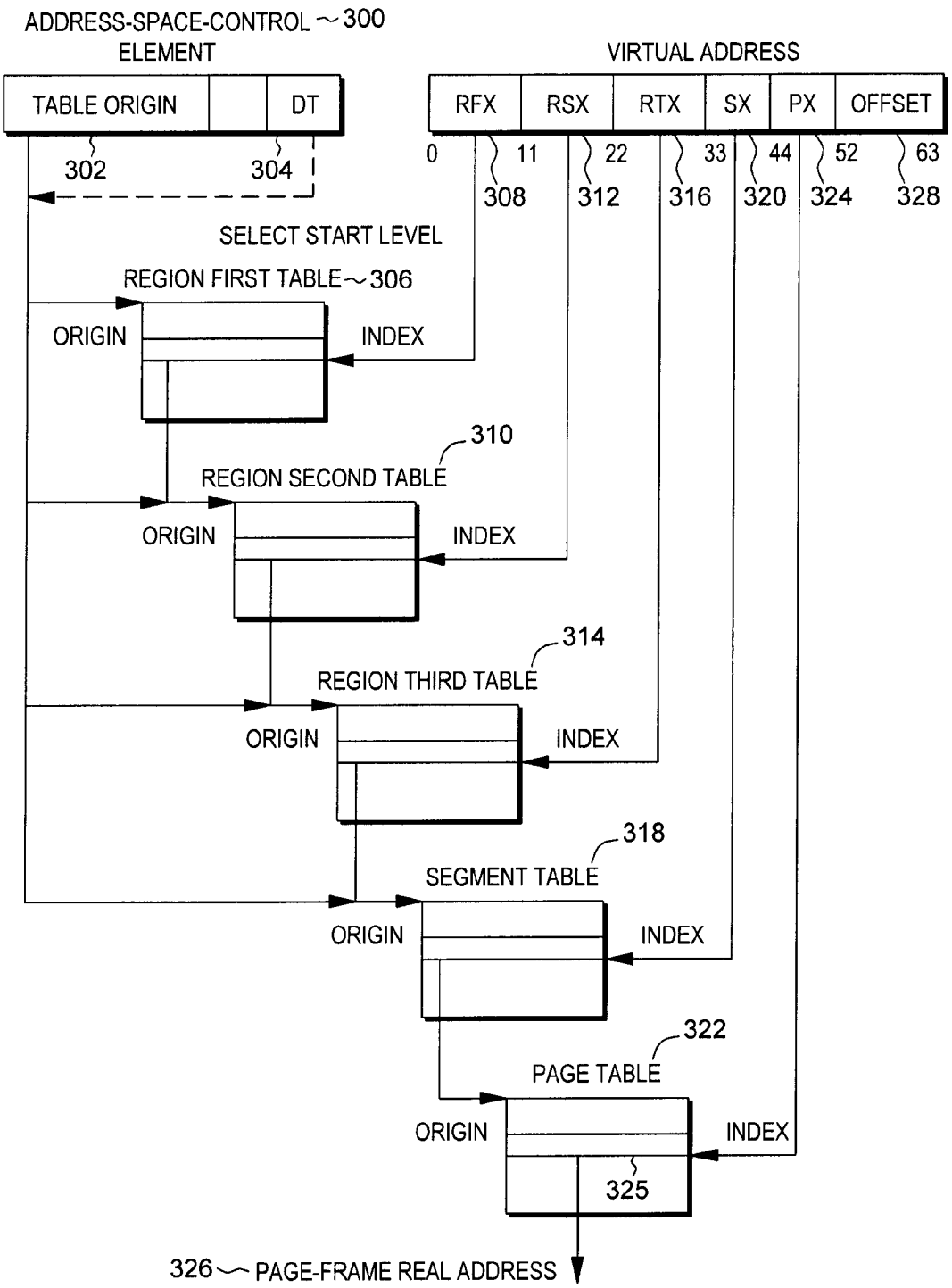
FIG. 3A depicts one example of address translation.
Figure 3B:
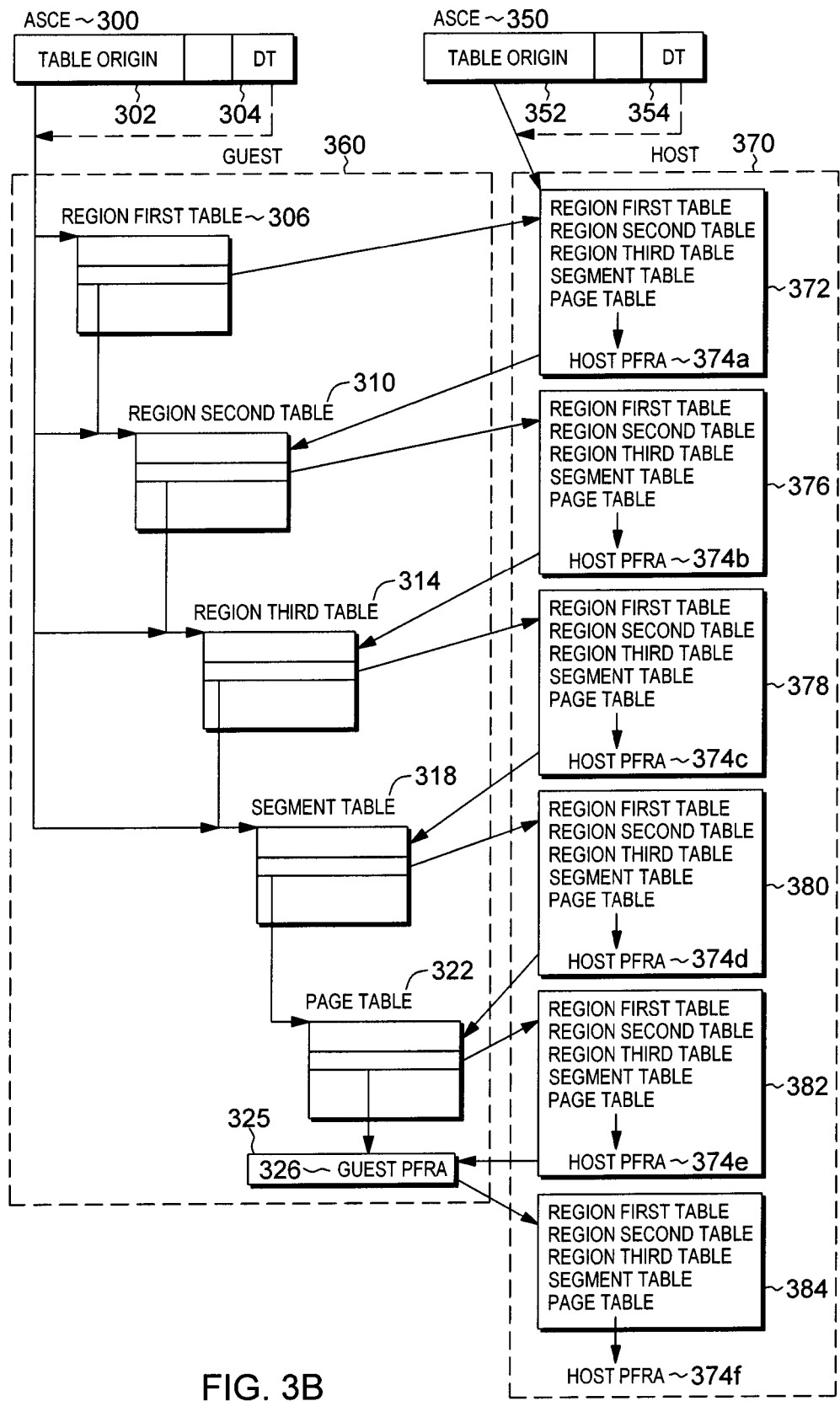
FIG. 3B depicts another example of address translation.

If so, translation continues with the next level of DAT table (e.g., a region second table 310 if the root was a region first table, as shown in FIGS. 3A-3B), STEP 764. Otherwise, final host address translation is performed, as described in FIG. 3B, STEP 777. For instance, the guest page frame real address (PFRA) 326 is translated using the host DAT structures (e.g., DAT structures 384) to obtain the host page frame real address. The host page frame real address (PFRA) 374f is then concatenated with the offset of the host virtual address, and this translated address is provided to the requestor, STEP 778.

As described herein, in accordance with one or more aspects, storage keys, host page table entries and/or page status table entries are extended to indicate guest use for active page table translation. In one or more aspects, the guest page table walk is extended to mark a storage key, a host PTE and/or PGSTE to indicate it is to be in guest use for active DAT table translation when a page is referenced during a guest DAT table walk. In one embodiment, this scheme does not require the guest to execute new instructions to mark a page as backing guest DAT tables and inform the hypervisor of this use of this page. In a multi-level guest/host relationship, the pages are recursively marked, so that each host is aware of the original active guest DAT table use.

In another example, the host page may be marked only if it backs specific guest DAT tables (e.g., guest segment and region tables but not guest page tables). In another example, multiple marks are provided to distinguish between host pages that back one type or group of types of guest DAT tables (e.g. guest segment or region tables) from those that back another type or group of types of guest tables (e.g. guest page tables). The specifics of these refinements could be based on the structure and implementation of the hierarchical TLB or on the DAT management algorithm used by the guest and/or host operating system. Other variations also exist.

In one aspect, only host pages that are in active use, that is, are actively being referenced by the guest, are marked, rather than all pages of a potentially large guest DAT table in which many pages may be inactive. This indicates a working set of active DAT tables, rather than all DAT tables, and enables the hypervisor to page-out invalid guest DAT table sections without requiring any of the interlocks required to page-out active page tables (DAT entries). Further, aspects of the present invention may be employed in conjunction with unmodified guest operating systems using paging, e.g., older operating system versions or operating systems that have not been extended to use an alternate instruction-based notification mechanism.

Figure 8A:
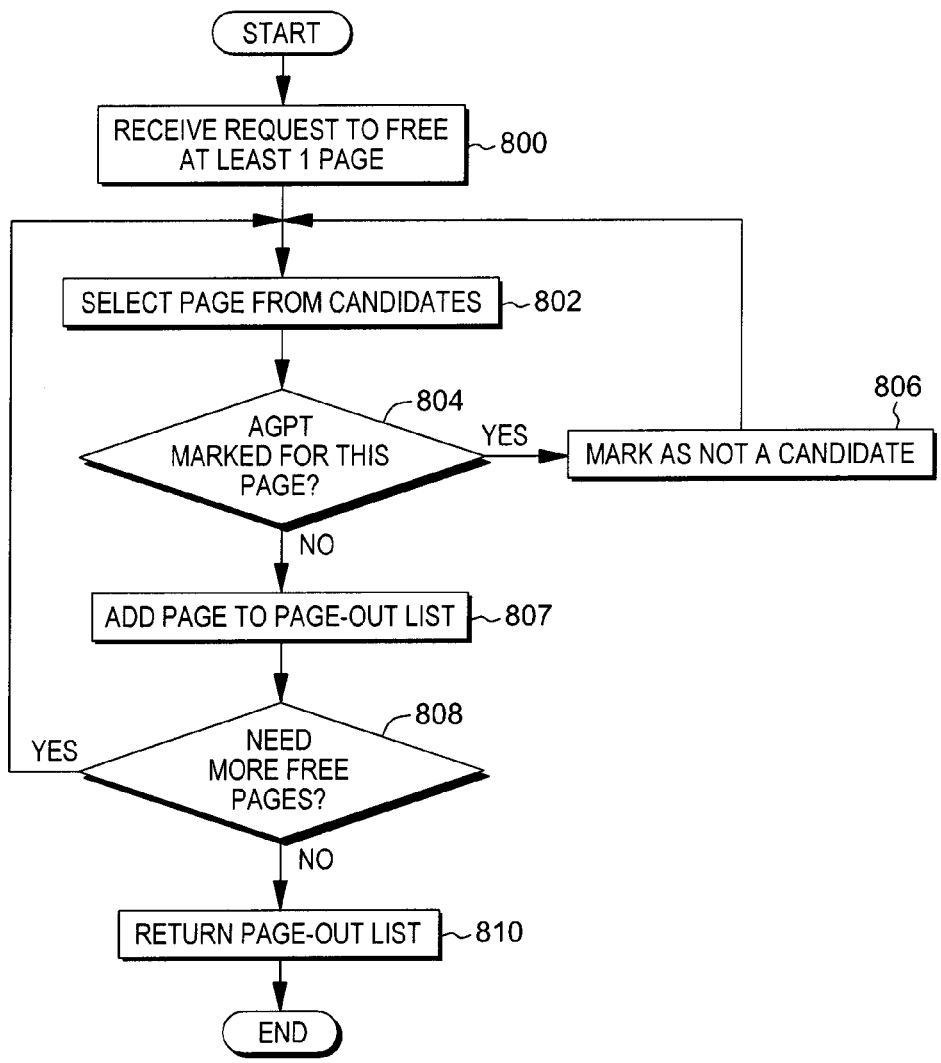
FIG. 8A depicts one example of logic for host-based page-out selection, in accordance with an aspect of the present invention.

In yet a further aspect, the AGPT indicators are used in memory management. For instance, memory management actions, such as paging-out of memory, are performed based on the AGPT indicators. One embodiment of host-based page-out selection logic is described with reference to FIG. 8A. In one example, this logic is performed by a virtual machine manager, such as a hypervisor or a host program, as examples.

Initially, a request is received by a virtual machine manager, e.g., from a program, other virtual machine, etc., to free at least one block of memory, STEP 800. In this example, the block of memory is a page of memory, but in other examples, the block may be other sizes. A page to be freed is selected from a set of candidate pages, STEP 802. A determination is then made, in accordance with an aspect of the present invention, of whether the AGPT is marked for the selected page to be freed, INQUIRY 804. That is, the AGPT in an associated storage key, host PTE, PGSTE or other location is checked. If it is marked (e.g., AGPT=0), then the page is marked as not a candidate for paging-out by the host, STEP 806, and processing continues to STEP 802. That is, the page is marked as not being available for further use (i.e., not free) by, e.g., a host or another guest. In another embodiment, there is no marking of non-candidacy; instead, no indication is provided—the page is just not placed on a page-out list (also known as a free list).

Returning to INQUIRY 804, if the AGPT is not marked for this page (e.g., AGPT=1), then it is added to a page-out list, STEP 807, and a determination is made as to whether more pages are to be freed, INQUIRY 808. If more pages are to be freed, then processing continues to STEP 802. Otherwise, the page-out list is returned, STEP 810. The returned page-out list includes a list of one or more potential blocks of host memory that may be used for paging operations, and/or to make memory available for further use. As examples, the further use includes reclaiming a block of memory for use by a host, another guest and/or the same guest.

Figure 8B:
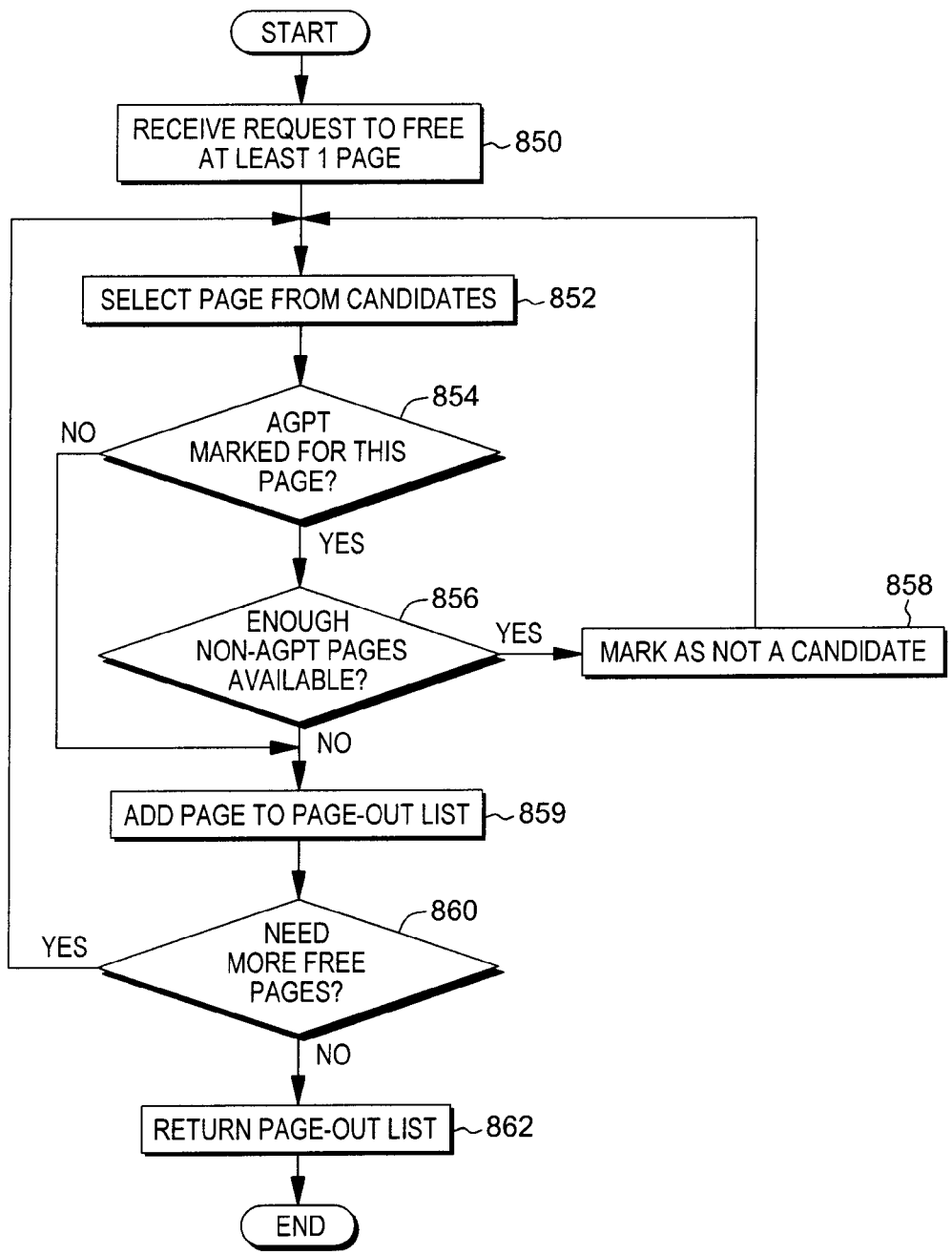
FIG. 8B depicts another example of logic for host-based page-out selection, in accordance with an aspect of the present invention.

Another embodiment of host-based page-out selection logic is described with reference to FIG. 8B. Initially, a request is received by a virtual machine manager to free at least one block of memory (e.g., one page), STEP 850. A page to be freed is selected from a set of candidate pages, STEP 852. A determination is then made, in accordance with an aspect of the present invention, of whether the AGPT is marked for the selected page, INQUIRY 854. If it is marked, then, in this embodiment, a further determination is made as to whether there are enough non-AGPT pages available to be freed, INQUIRY 856. The determination of enough may be based on, for instance, an absolute number, number of present requests, a fraction of total pages, a multiple of current requests, etc. If there are enough non-AGPT pages, then the page is marked as not being a candidate for paging out by the host, STEP 858, and processing continues to STEP 852.

However, if there are not enough non-AGPT pages, INQUIRY 856, or if the AGPT is not marked for this page, INQUIRY 854, then it is added to a page-out list, STEP 859, and a determination is made as to whether more pages are to be freed, INQUIRY 860. If more pages are to be freed, then processing continues to STEP 852. Otherwise, the page-out list is returned, STEP 862.

By checking the AGPT indicators in selecting the blocks of memory to be freed, those blocks of memory backing guest address translation structures may not be freed, and therefore, fewer TLB entries may need to be purged.

In a further aspect, the setting of the AGPT is facilitated, e.g., when a DAT table is created, by using an instruction, referred to herein as an Extract and Set Storage Attributes (ESSA) instruction. The Extract And Set Storage Attributes instruction is valid for pageable guests, and in one example is executed at the request of a guest and without intervention by the host.

Figure 9A:
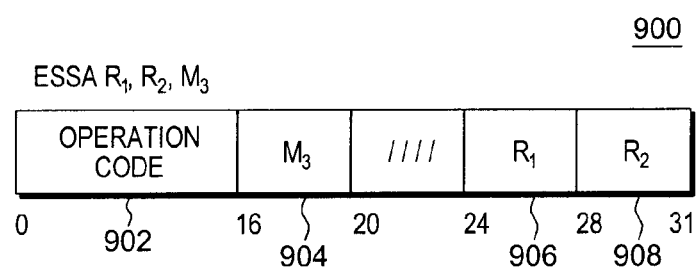
FIG. 9A depicts one example of an Extract And Set Storage Attributes (ESSA) instruction, in accordance with one or more aspects of the present invention.

One example of a format of an ESSA instruction is described with reference to FIG. 9A. An Extract And Set Storage Attributes (ESSA) instruction 900 includes an operation code 902 specifying that this is an ESSA operation; an $M_3$ field 904 indicating the operation to be performed; a designation 906 ($R_1$) for an output register into which the guest block states, the host block states, and the AGPT are extracted; and a designation 908 ($R_2$) for an input register which designates the guest absolute address of the block of memory for which the block states and the AGPT are to be extracted and optionally set, per the operation code.

With this instruction, the block usage state (e.g., the guest state), the block content state (e.g., the host state), and the AGPT of the block designated by the second operand (e.g., the register specified in $R_2$) are extracted into the first operand location (e.g., the register specified by $R_1$). The block usage state, the block content state, and/or the AGPT indicator may optionally be set (e.g., in the host PTE, the PGSTE, and/or the storage key) based on the value of the $M_3$ field. Asynchronous to the execution of the instruction, the block usage state, the block content state, and/or the AGPT indicator may be changed.

In operation, a plurality of bits of the general purpose register designated in $R_2$ specifies a block in absolute storage (e.g., a 4K-byte block), and when the instruction completes, the general register designated by the $R_1$ field contains the guest block usage state, the host block content state, and the AGPT indicator of the designated block before any specified state change is made.

Figure 9B:
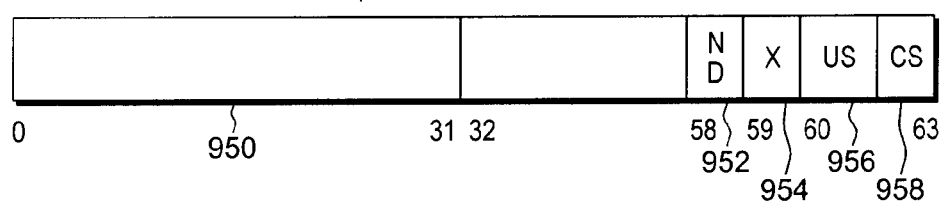
FIG. 9B depicts one example of fields of a register specified by the Extract And Set Storage Attributes instruction, in accordance with one or more aspects of the present invention.

One example of a format of the register specified by the $R_1$ field is depicted in FIG. 9B.

In one example, the register specified by $R_1$ includes the following information:

Unused (bits 0-57) 950: These bits are unused, in this example;

Block No-DAT Indication (ND, bit 58) 952: In accordance with an aspect of the present invention, when this indicator is zero, the block may be used for guest dynamic address translation tables (AGPT is set for this block); and when the indicator is one, the block does not contain guest dynamic address translation tables (AGPT is not set for this block).

Exception Indication (X, bit 59) 954: When an enhanced DAT facility 1 is installed, this field is an exception indication. When the exception indication is zero, the operation specified by the operation request code was successfully completed. When the exception indication is one, the states of the block are returned, however, the operation specified by the operation request code is not successfully completed; and the operation completes without changing the block content state or the block usage state. This indicator is set to one, when the following conditions apply:

The block usage and content state are stable and resident, respectively;
An attempt is made to set a non-stable state.

Block Usage State (US, bits 60-61) 956: This field includes a code value indicating the guest block usage state of the designated block. Example block usage states include:
Stable State (S)
Unused State (U)
Potentially Volatile State (P)
Volatile State (V)

Block Content State (CS, bits 62-63) 958: This field includes a code value indicating the host block content state of the designated block. Example block content states include:
Resident State (r)
Reserved
Preserved State (p)
Logically Zero State (z)

Returning to FIG. 9A, the $M_3$ field designates an operation request code specifying the operation to be performed. Example operations that may be performed include:

Extract Block Attributes: The current block usage state, the block content state, and the AGPT of the designated block are extracted. No change is made to the states.

Set Stable State: The current block usage state, the block content state, and the AGPT of the designated block are extracted. Following extraction, the block usage state is set to the stable state (S); and in accordance with an aspect of the present invention, the AGPT indicator is set (e.g., to zero), in, e.g., one or more data structures.

Set Unused State: The current block usage state, the block content state, and the AGPT of the designated block are extracted. Following extraction, the block usage state is set to the unused state (U). Further, if the block content state is the preserved state (p), the contents of the block are discarded, and the block content state is set to the logically zero state (z).

Set Volatile State: The current block usage state, the block content state, and the AGPT of the designated block are extracted. Following extraction, the block usage state is set to the volatile state (V). Also, if the block content state is the preserved state (p), the contents of the block are discarded, and the block content state is set to the logically zero state (z).

Set Potentially Volatile State: The current block usage state, the block content state, and the AGPT of the designated block are extracted. Following extraction, the following occurs:
(1) If the block content state is the resident state (r), the block usage state is set to the potentially volatile state (P).
(2) If the block content state is the preserved state (p) and the change bit for the designated block is one, the block usage state remains the stable state (S) and the block content state remains the preserved state.
(3) If the block content state is the preserved state (p) and the change bit for the designated block is zero, the contents of the block are discarded, and the block usage state is set to the volatile state (V), and the block current state is set to the logically zero state (z).
(4) If the block content state is the logically zero state (z), the block usage state is set to the volatile state (V).

Set Stable and Make Resident: The current block usage state, the block content state, and the AGPT of the designated block are extracted. Following extraction, the block contents are made resident and the block state is set to the stable state (S), and the block content state is set to the resident state.

Set Stable If Resident: The current block usage state, the block content state, and the AGPT of the designated block are extracted. Following extraction, the block usage state is set to the stable state (S), if the block content state is the resident state (r).

Set Stable and Set No-DAT: The current block usage state, the block content state, and the AGPT of the designated block are extracted. Following extraction, the block usage state is set to the stable state, and in accordance with an aspect of the present invention, the AGPT indicator is cleared (e.g., set to one) in, e.g., one or more data structures.

In one example, when the $M_3$ code indicates an indicator, such as the AGPT, is to be set, it is set in one or more selected locations, such as in one or more of the host page table entry, a page status table entry, a storage key or other defined location.

Figure 10:
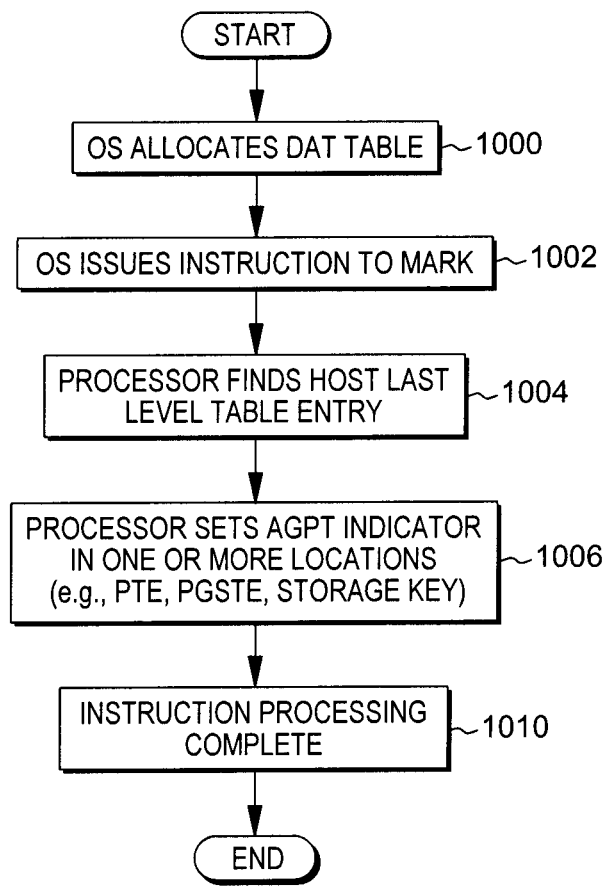
FIG. 10 depicts one example of using the ESSA instruction to mark memory, in accordance with an aspect of the present invention.

One embodiment of using the ESSA instruction to perform marking is described with reference to FIG. 10. In one example, a guest control program, such as an operating system (OS), allocates an address translation table, such as a DAT table (e.g., a page table, a segment table, a region table, etc.), STEP 1000. Further, the guest control program issues the ESSA instruction and marks that the specified guest block holds a DAT table, STEP 1002. Based on executing the instruction with the proper indication, the processor locates e.g., using the block address provided in the instruction, the host last level table entry (e.g., PTE), STEP 1004. As an example, this is provided by performing a page table walk using the provided address. Other examples are also possible.

Thereafter, the processor sets the AGPT in one or more locations, STEP 1006. For instance, it indexes into the host page table using the host translation of the block address provided in the second operand and sets the indicator in the host page table entry (PTE). In further examples, it locates the page status table based on the location of the page table, and sets the indicator in the page status table entry (PGSTE); and/or it sets the indicator in the storage key associated with the host page frame real address (PFRA) stored in the PTE. Further, the processor may set the indicator in other selected locations. The ESSA processing is complete, STEP 1010.

As described herein, a selected data structure, e.g., a host page table entry, a page status table entry (i.e., an entry associated with a given address translation structure), or a storage key is marked with an indicator indicating whether or not the block of memory (e.g., page) is backing a guest address translation structure, such as a page table, a segment table, a region table, and/or any other table used for address translation.

The AGPT indicators offer a way to track actual in-use address translation structures. The indicators do not require, in one embodiment, a guest operating system to be modified. However, if a guest randomly re-uses blocks of memory to back address translation structures, over time, an excessive number of blocks of memory may be marked as AGPT due to one-time use of a subject block of memory as a block of memory storing a guest address translation structure. This may cause the page allocation technique in the host to become unnecessarily fragmented. Thus, in accordance with one or more aspects of the present invention, the marking capability includes a resetting feature to reset the AGPT indicators stored in address translation entries and/or other selected locations. As examples, the resetting is performed in a coherent, safe manner and it may employ only a single guest translation look-aside buffer (TLB) invalidation.

In accordance with one or more aspects, the resetting of the AGPT indicators may be performed in parallel with guest execution, including guest address translation. The resetting may be implemented in host code, in millicode, using a finite state machine, using other hardware mechanisms, or by other mechanisms. When the resetting or clearing of the AGPT indicators is complete, the guest TLB is invalidated.

One embodiment of logic to reset AGPT indicators is described with reference to FIG. 11A. This logic is performed, for instance, by the processor.

Figure 11A:
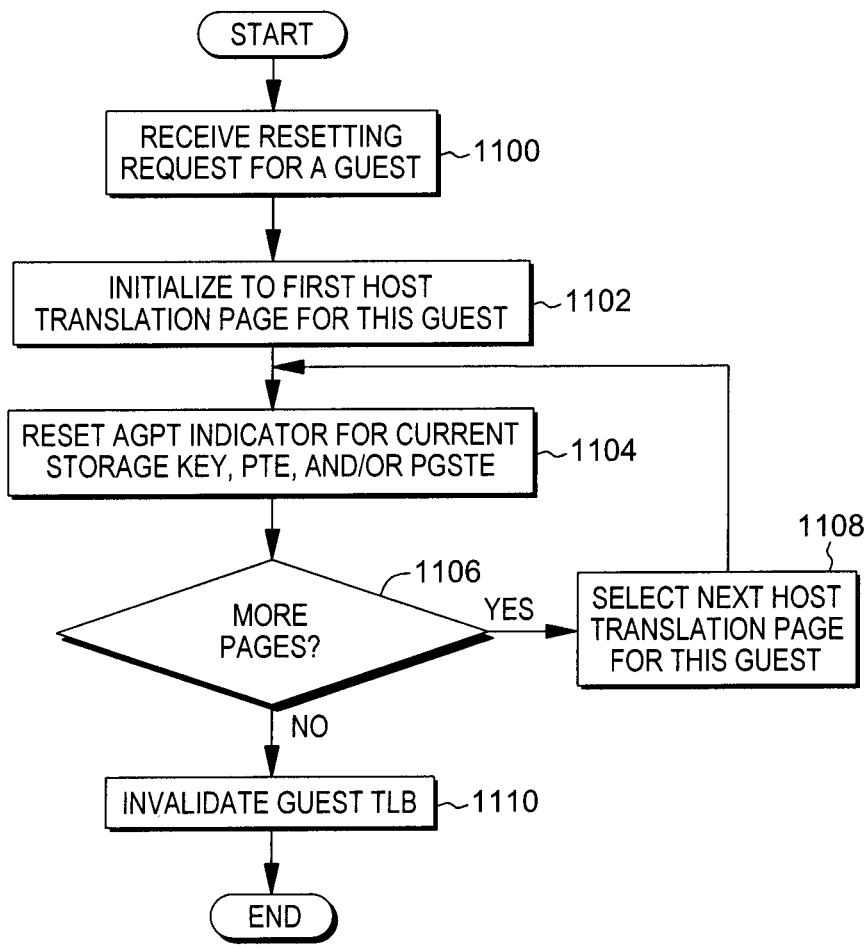
FIG. 11A depicts one example of logic to reset Active Use for Guest Page Table indicators, in accordance with an aspect of the present invention.

Referring to FIG. 11A, in one embodiment, the processor receives a request to reset AGPT indicators for a particular guest, STEP 1100. Based on this request, the processor initializes the resetting logic to a first host translation page (block of memory) for this guest, STEP 1102. For instance, the processor translates a selected guest virtual address assigned to the guest, as described above, to obtain a particular page table entry that corresponds to the virtual address, and therefore, the page for the guest.

The processor then resets the AGPT indicator for this page in one or more defined locations, STEP 1104. For instance, it resets the indicator in the page table entry. As a further example, based on the page table entry, it locates a page status table entry, and resets the indicator stored therein. In yet a further example, it uses the page frame real address in the page table entry to locate a storage key corresponding to the page and resets the AGPT indicator stored therein.

In one embodiment, the resetting includes setting the indicator to a particular value, such as one, regardless of its current value. In another embodiment, the resetting includes setting the indicator to the particular value, such as one, based on a determination that the current value is another value, such as zero. Thus, as used herein, resetting processing is to include one of the embodiments, both of the embodiments, and/or other embodiments.

A determination is made as to whether there are more pages to be processed, INQUIRY 1106. If there are more pages, then the next host translation page for this guest is selected, STEP 1108. That is, the next guest virtual address is selected and its corresponding PTE is obtained, either by performing translation or by selecting the next PTE in sequential order once the page table is located, as examples. Processing continues to STEP 1104.

Returning to INQUIRY 1106, if there are no more pages to be processed for this guest, then the guest TLB is invalidated, STEP 1110, and processing is complete. For instance, all of the entries in the TLB for the selected guest are cleared. This concludes the resetting logic.

The resetting of the AGPT indicators may be performed concurrently with guest and/or host execution, including guest and/or host address translations.

Another embodiment of logic to reset AGPT indicators is described with reference to FIG. 11B. This logic is related to safely resetting AGPT indicators in an SMP (Simultaneous Multi-Processor) system, and is performed, for instance, by the processor. In particular, in at least one embodiment, the AGPT resetting logic is executed in an SMP processor where multiple cores may execute host code. During the time between the initiation of AGPT reset and the completion of the TLB flush, AGPT under-indication may be present, since the TLB entries have not been flushed, but associated AGPT indicators have been reset. Thus, in accordance with one aspect, this period of time is identified by setting an AGPT in-progress indicator at the start of the AGPT resetting to the completion of the TLB flush.

During this time, in one embodiment, the host does not perform page management on another host processor for the present guest. Further, in one embodiment, if another CPU is performing memory management operations and it sees that this in-progress indicator is set for the guest, then when it does an invalidate (such as an IPTE (Invalidate Page Table Entry) instruction), it will flush all entries from the TLB for the guest.

Figure 11B:
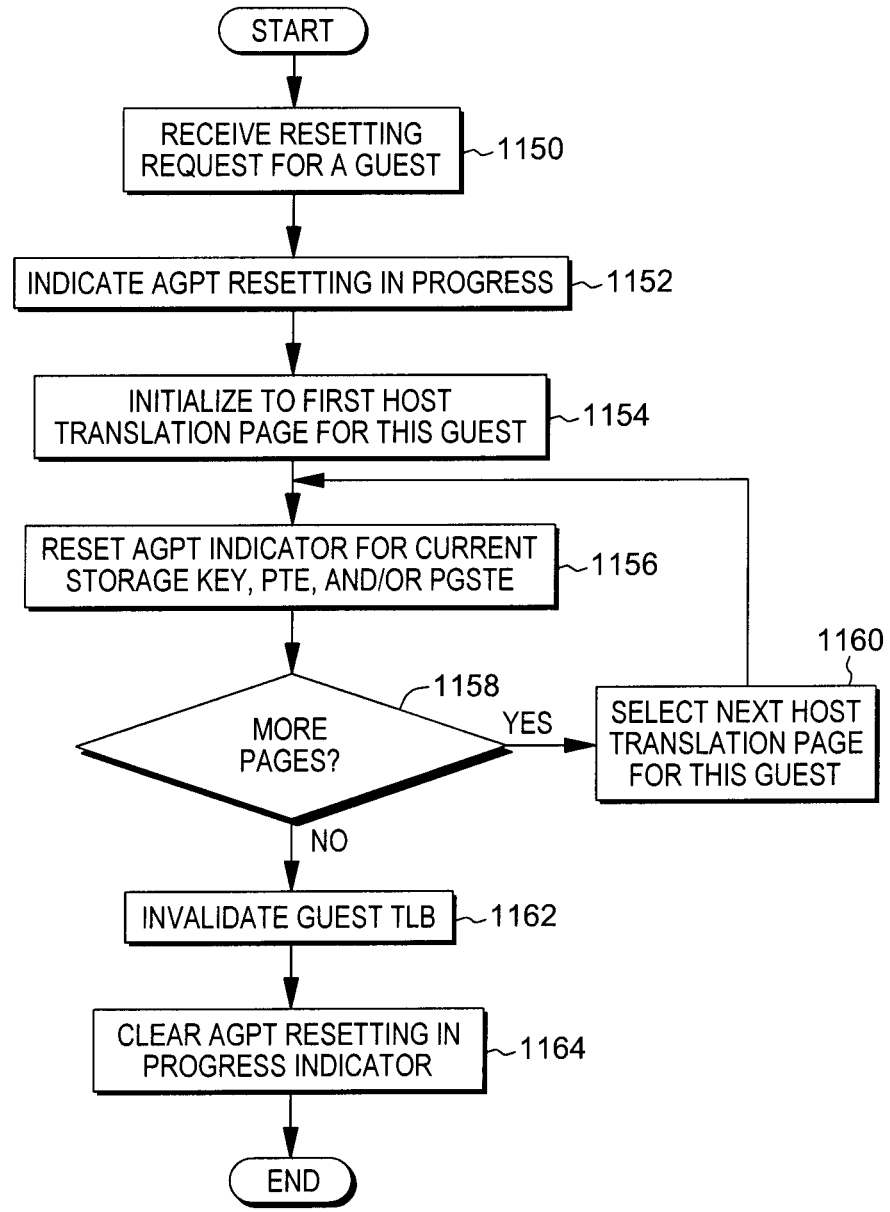
FIG. 11B depicts another example of logic to reset Active Use for Guest Page Table indicators, in accordance with an aspect of the present invention.

Referring to FIG. 11B, in one embodiment, the processor receives a resetting request for a guest, STEP 1150, and indicates that AGPT resetting is in progress for the guest, STEP 1152. This indication may be performed by setting a per guest in-progress indicator in a selected location, such as a selected register, a memory location, etc., to a defined value, such as one. Based on this request, the processor initializes the resetting logic to a first host translation page (block of memory) for this guest, STEP 1154. For instance, the processor translates a selected guest virtual address assigned to the guest, as described above, to obtain a particular page table entry that corresponds to the virtual address, and therefore, the page for the guest.

The processor then resets the AGPT indicator for this page in one or more defined locations, STEP 1156. For instance, it resets the indicator in the page table entry. As a further example, based on the page table entry, it locates a page status table entry, and resets the indicator stored therein. In yet a further example, it uses the page frame real address in the page table entry to locate a storage key corresponding to the page and resets the AGPT indicator stored therein.

In one embodiment, the resetting includes setting the indicator to a particular value, such as one, regardless of its current value. In another embodiment, the resetting includes setting the indicator to the particular value, such as one, based on a determination that the current value is another value, such as zero. Thus, as used herein, resetting processing is to include one of the embodiments, both of the embodiments, and/or other embodiments.

A determination is made as to whether there are more pages to be processed, INQUIRY 1158. If there are more pages, then the next host translation page for this guest is selected, STEP 1160. That is, the next guest virtual address is selected and its corresponding PTE is obtained, either by performing translation or by selecting the next PTE in sequential order once the page table is located, as examples. Processing continues to STEP 1156.

Returning to INQUIRY 1158, if there are no more pages to be processed for this guest, then the guest TLB is invalidated, STEP 1162. Further, the indication that resetting is in progress for this guest is cleared, STEP 1164. For instance, the in-progress indicator for the guest is set to a defined value, such as zero. Processing is complete.

As described above, set AGPT indicators are reset. For instance, in sequence, all the AGPT indicators (or a selected subset in another embodiment) for a guest are invalidated. If concurrently, new translations are created in a TLB during guest page walks, AGPT indicators which have been cleared are set again potentially causing over-indication. When the clearing of all the AGPT indicators (or a selected subset in another embodiment) concludes, the guest TLB is invalidated. AGPT indicators which have been set during the clearing process result in over-indication, which is a safe side effect of the clearing process.

In one particular embodiment, the AGPT indicators are simultaneously flash-invalidated, reducing the time window in which over-indications can be performed. In yet a further embodiment, AGPT indicators and TLBs are simultaneously flash-invalidated, further reducing such time window. For instance, the guest virtual CPUs are undispatched, the resetting processing is performed, and then they are re-dispatched. Therefore, to the guest, it looks like the resetting of the indicators for their pages was performed instantaneously, since they were not running. Further, since they are not running, they cannot set the indicators during the process, and therefore, no over-indication.

Described above is a technique for resetting AGPT indicators while performing multiple levels of translation (e.g., guest/host translation). The AGPT indicators are used by, e.g., hardware, to mark those guest pages that include address translation structures.

One embodiment of further details relating to resetting indicators, in accordance with an aspect of the present invention, is described with reference to FIGS. 12A-12B.

Figure 12A:
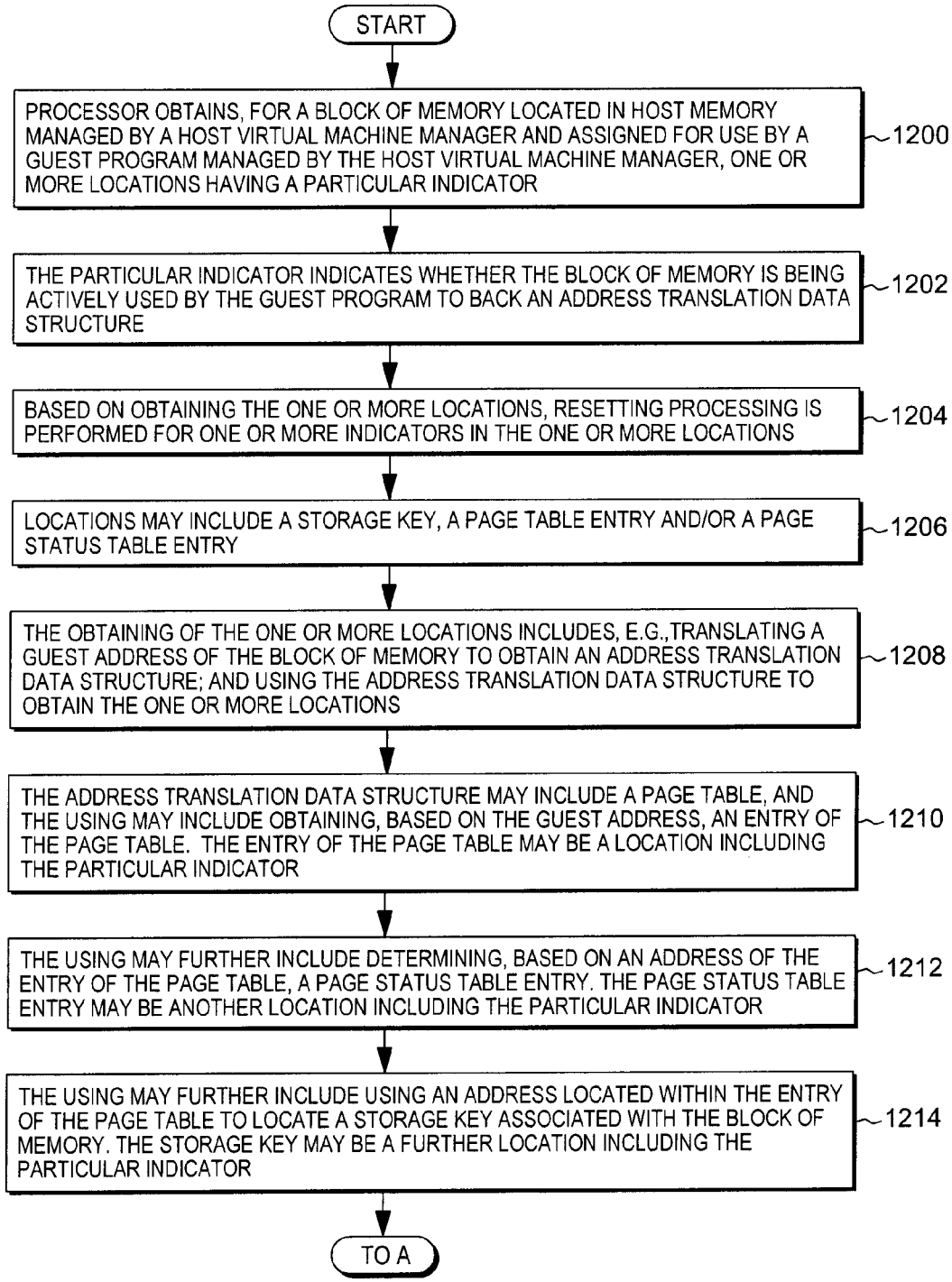
FIGS. 12A-12B depict one embodiment of resetting logic, in accordance with an aspect of the present invention.

Referring to FIG. 12A, in one embodiment, a processor obtains, for a block of memory located in host memory managed by a host virtual machine manager and assigned for use by a guest program managed by the host virtual machine manager, one or more locations having a particular indicator (1200). The particular indicator indicates whether the block of memory is being actively used by the guest program to back an address translation data structure (1202). Based on obtaining the one or more locations, resetting processing is performed for one or more indicators in the one or more locations (1204). This resetting may alleviate unnecessary fragmentation of memory in the host.

As examples, the one or more locations include at least one of a storage key, a page table entry or a page status table entry corresponding to the block of memory (1206).

In one embodiment, the obtaining of the one or more locations includes, for instance, translating a guest address of the block of memory to obtain an address translation data structure; and using the address translation data structure to obtain the one or more locations (1208). For instance, the address translation data structure may include a page table, and the using may include obtaining, based on the guest address, an entry of the page table, the entry of the page table being a location including the particular indicator (1210).

As another example, the using may further include determining, based on an address of the entry of the page table, a page status table entry, the page status table entry being another location including the particular indicator (1212). Yet further, the using may further include using an address located within the entry of the page table to locate a storage key associated with the block of memory, the storage key being a further location including the particular indicator (1214).

Figure 12B:
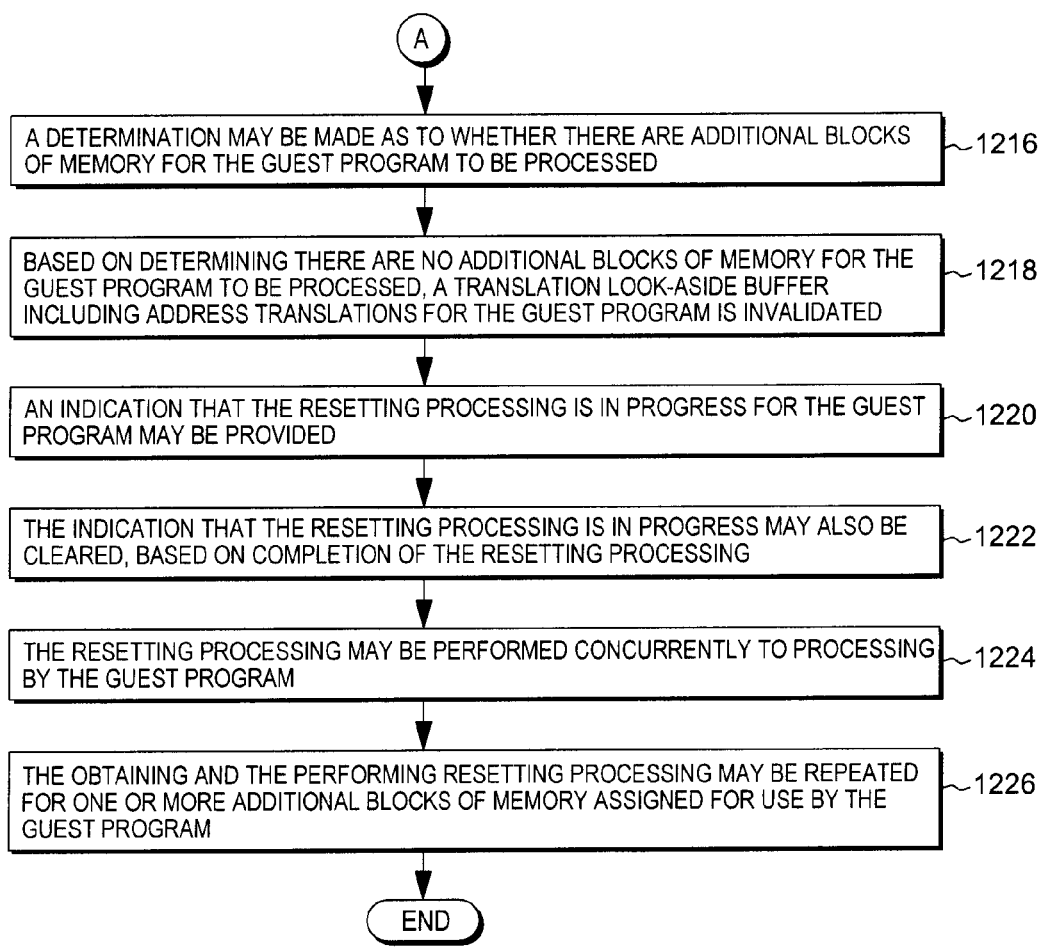

In a further aspect, a determination is made as to whether there are additional blocks of memory for the guest program to be processed (1216) (FIG. 12B). Based on determining there are no additional blocks of memory for the guest program to be processed, a translation look-aside buffer including address translations for the guest program is invalidated (1218).

In yet another aspect, an indication that the resetting processing is in progress for the guest program is provided (1220). This enables the resetting processing to be safely used in multiprocessing environments. Further, the indication that the resetting processing is in progress may be cleared, based on completion of the resetting processing (1222).

In one embodiment, the resetting processing is performed concurrently to processing by the guest program (1224). This facilitates processing and may enhance performance. Further, in one embodiment, the obtaining and the performing resetting processing are repeated for one or more additional blocks of memory assigned for use by the guest program (1226).

As used herein, main memory and main storage are used interchangeably unless otherwise noted explicitly or implicitly.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 13:
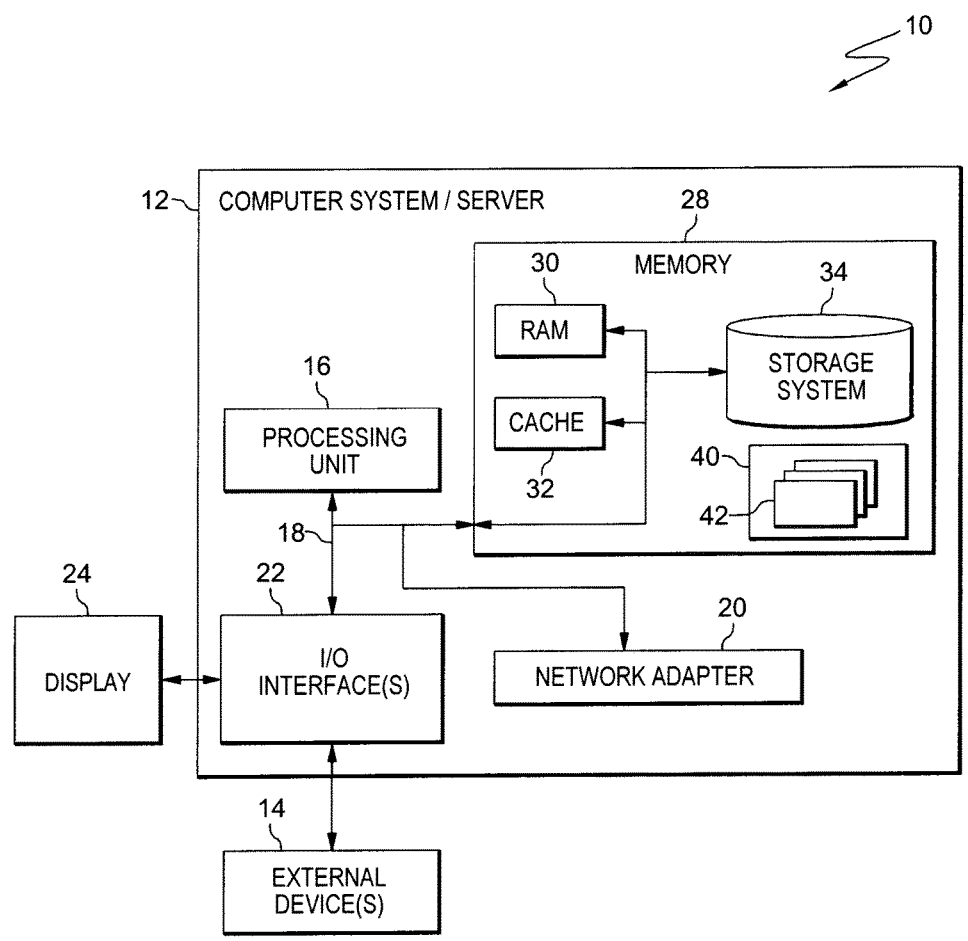
FIG. 13 depicts one embodiment of a cloud computing node.

Referring now to FIG. 13, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 14:
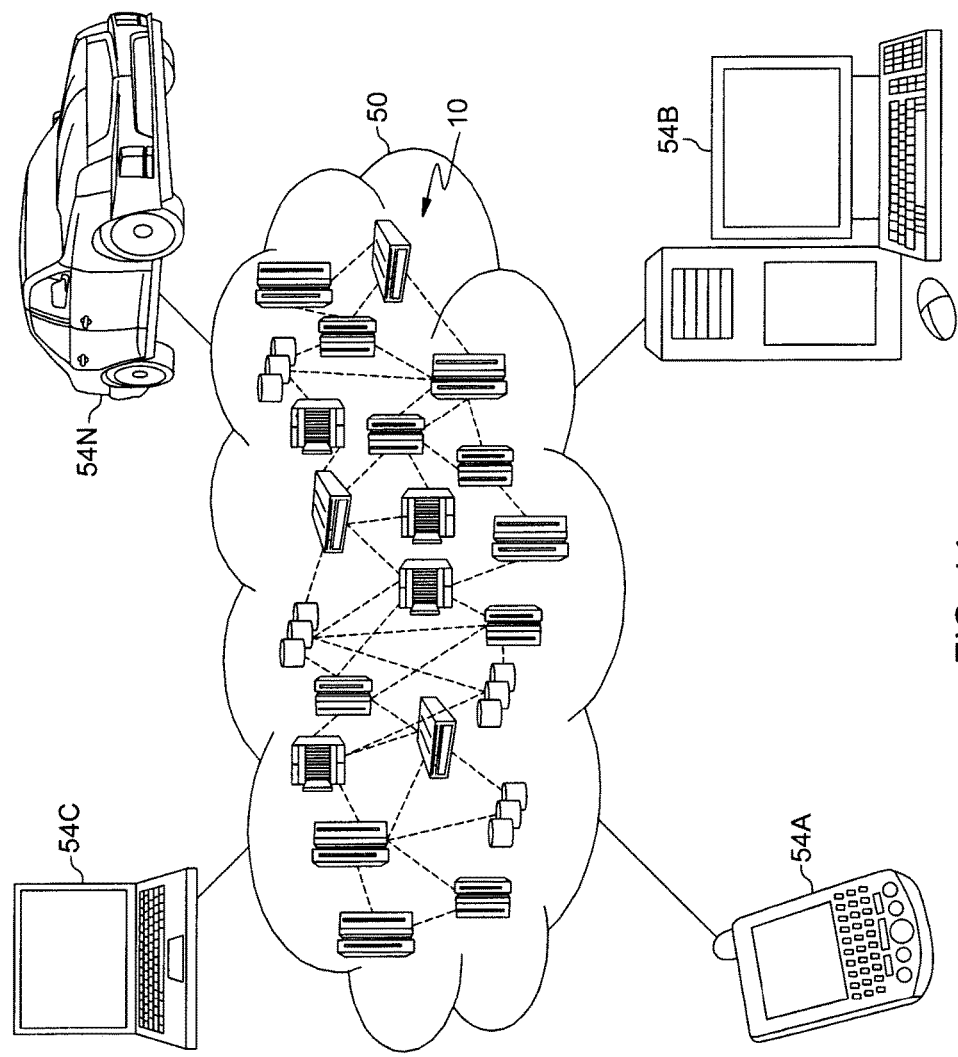
FIG. 14 depicts one embodiment of a cloud computing environment.

Referring now to FIG. 14, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 15:
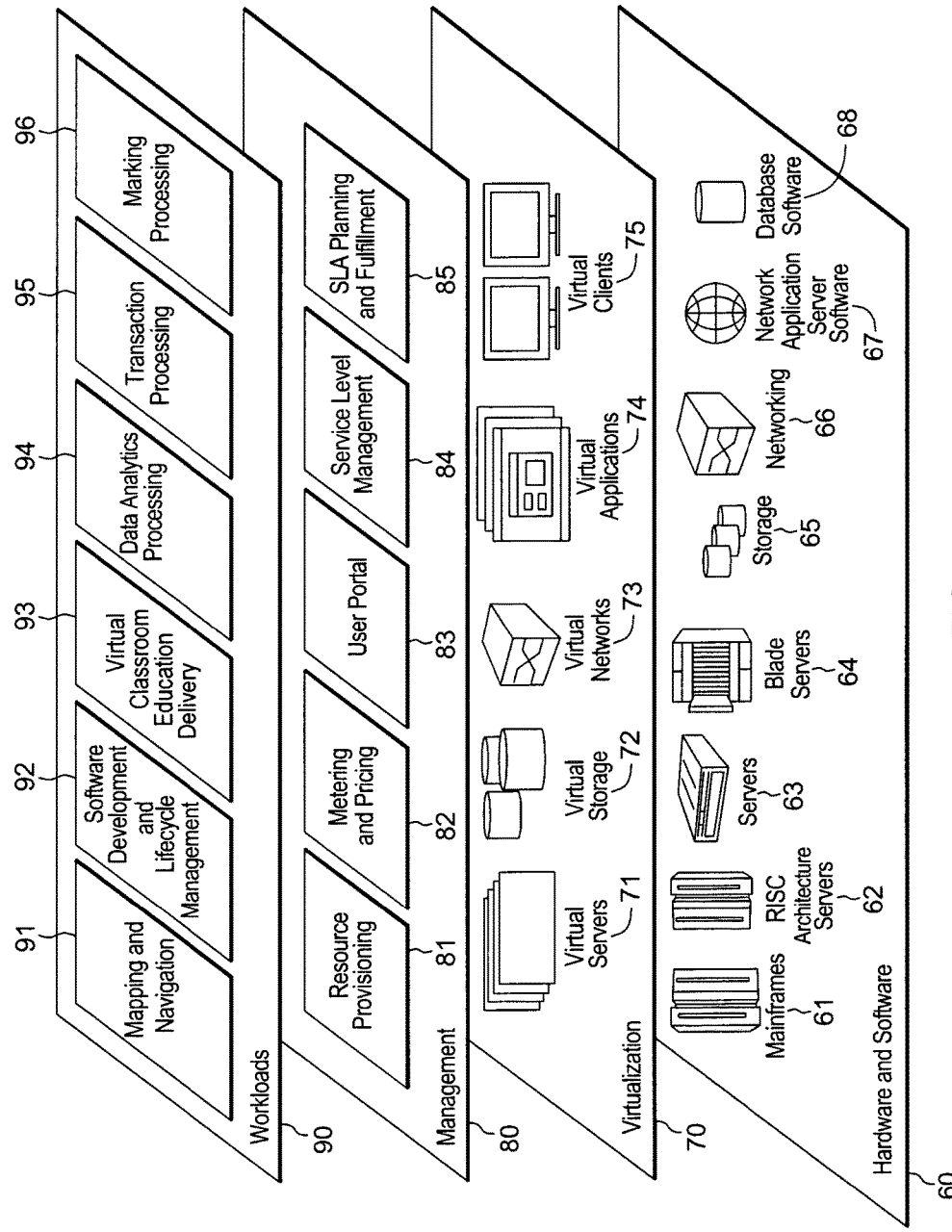
FIG. 15 depicts one example of abstraction model layers.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and marking processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of resetting indicators of a computing environment, said computer-implemented method comprising:

obtaining, by a processor, for a block of memory located in host memory managed by a host virtual machine manager and assigned for use by a guest program managed by the host virtual machine manager, one or more locations having a particular indicator, the particular indicator indicating whether the block of memory is being actively used by the guest program to back an address translation data structure for use in translating addresses, wherein the particular indicator is separate from a translated address and is set for the block of memory based on whether the guest program is using the block of memory for the address translation data structure; and performing resetting processing for one or more indicators in the one or more locations, based on obtaining the one or more locations.

2. The computer-implemented method of claim 1, wherein the one or more locations include at least one of a storage key, a page table entry or a page status table entry corresponding to the block of memory.

3. The computer-implemented method of claim 1, further comprising repeating the obtaining and the performing resetting processing for one or more additional blocks of memory assigned for use by the guest program.

4. The computer-implemented method of claim 1, wherein the obtaining comprises:

translating a guest address of the block of memory to obtain an address translation data structure; and using the address translation data structure to obtain the one or more locations.

5. The computer-implemented method of claim 4, wherein the address translation data structure comprises a page table, and the using comprises obtaining, based on the guest address, an entry of the page table, the entry of the page table being a location including the particular indicator.

6. The computer-implemented method of claim 5, wherein the using further comprises determining, based on an address of the entry of the page table, a page status table entry, the page status table entry being another location including the particular indicator.

7. The computer-implemented method of claim 5, wherein the using further comprises using an address located within the entry of the page table to locate a storage key associated with the block of memory, the storage key being a further location including the particular indicator.

8. The computer-implemented method of claim 1, further comprising:

determining whether there are additional blocks of memory for the guest program to be processed; and based on determining there are no additional blocks of memory for the guest program to be processed, invalidating a translation look-aside buffer including address translations for the guest program.

9. The computer-implemented method of claim 1, further comprising providing an indication that the resetting processing is in progress for the guest program.

10. The computer-implemented method of claim 9, further comprising clearing the indication that the resetting processing is in progress, based on completion of the resetting processing.

11. The computer-implemented method of claim 1, wherein the resetting processing is performed concurrently to processing by the guest program.

12. The computer-implemented method of claim 1, wherein the particular indicator is provided for one or more specific types of address translation data structures and not provided for at least one type of address translation data structure.

* * * * *